(12) United States Patent
Luo et al.

(10) Patent No.: US 8,884,899 B2
(45) Date of Patent: Nov. 11, 2014

(54) THREE-DIMENSIONAL INTERACTIVE DISPLAY

(75) Inventors: Wei Luo, Kanagawa (JP); Yuichi Tokita, Kanagawa (JP); Yoshio Goto, Kanagawa (JP); Seiji Yamada, Kanagawa (JP); Satoshi Nakamaru, Kanagawa (JP)

(73) Assignee: Sony Corporation, Tokyo (JP)

( * ) Notice: Subject to any disclaimer, the term of this patent is extended or adjusted under 35 U.S.C. 154(b) by 173 days.

(21) Appl. No.: 13/474,197

(22) Filed: May 17, 2012

(65) Prior Publication Data
US 2012/0313867 A1 Dec. 13, 2012

(30) Foreign Application Priority Data
May 26, 2011 (JP) ................. 2011-117981

(51) Int. Cl.
G06F 3/041 (2006.01)
G06F 3/042 (2006.01)
G02B 27/00 (2006.01)
G02B 27/22 (2006.01)

(52) U.S. Cl.
CPC .......... *G02B 27/0093* (2013.01); *G06F 3/0412* (2013.01); *G06F 3/042* (2013.01); *G06F 3/0425* (2013.01); *G02B 27/22* (2013.01)
USPC ........ 345/173; 345/87; 345/690; 348/333.01; 382/114; 382/232

(58) Field of Classification Search
CPC ..... G06F 3/017; G06F 1/3262; G06F 1/3265; G06F 3/0304; G06F 3/0412; G06F 3/042; G06F 3/0425; G06K 9/00335; G06K 9/00362; G06K 9/00382; G06K 9/00832; G06K 9/00389; G06K 9/3216; G06K 9/4671; G02B 27/225; G02B 27/22; G02B 27/2264; G02B 6/0068; G02B 15/14; G02B 2027/0138; G02B 2027/014; G02B 2027/0187; G02B 21/06; G02B 26/123; G02B 27/0172; G02B 27/06; G02B 27/10; G02B 27/26
USPC ............. 345/158, 173, 174; 348/169, 208.14, 348/46; 715/863; 382/103, 190, 181, 106, 382/173, 203, 224, 225
See application file for complete search history.

(56) References Cited

U.S. PATENT DOCUMENTS 8,073,268 B2 * 12/2011 Haskell ................... 382/232
2008/0013793 A1 * 1/2008 Hillis et al. ............. 382/114
(Continued)

OTHER PUBLICATIONS

European Patent Office, Extended European Search Report issued in connection with European Patent Application No. 12003250.3, dated Aug. 21, 2012. (6 pages).

(Continued)

*Primary Examiner* — Alexander Eisen
*Assistant Examiner* — Kenneth B Lee, Jr.
(74) *Attorney, Agent, or Firm* — K&L Gates LLP

(57) ABSTRACT

Provided is a thin three-dimensional interactive display which enables multi-touch sensing and three-dimensional gesture recognition. The three-dimensional interactive display includes a light source for irradiating an object to be detected with a light, a light modulation layer, into which a scattered light generated by irradiating the object with the light from the light source enters, at least for modulating an intensity of the scattered light, a transparent light-receiving layer for receiving the light transmitted through the light modulation layer, and a display panel or a back light panel disposed on the opposite side of the transparent light-receiving layer from the light modulation layer. The transparent light-receiving layer has a two-dimensional array of light-receiving elements.

9 Claims, 37 Drawing Sheets

(56) References Cited

U.S. PATENT DOCUMENTS

| | | | |
|---|---|---|---|
| 2008/0024126 A1 | 1/2008 | Sasaki et al. | |
| 2008/0165267 A1* | 7/2008 | Cok | 348/333.01 |
| 2009/0015978 A1 | 1/2009 | Clark | |
| 2010/0032843 A1 | 2/2010 | Chen et al. | |
| 2011/0001905 A1 | 1/2011 | Tanaka | |
| 2011/0019056 A1* | 1/2011 | Hirsch et al. | 348/333.01 |

OTHER PUBLICATIONS

Hodges, et al., "ThinSight: versatile multi-touch sensing for thin form-factor displays," UIST '07: Proceedings of the 20th annual ACM symposium on User interface software and technology, Newport, Rhode Island, USA, pp. 259-268.

Lee et al., "A Multi-Touch Three Dimensional Touch-Sensitive Tablet," Proceedings of the SIGCHI conference on Human factors in computing systems, pp. 21-25, Apr. 1985, San Francisco, California. (5 pages).

W. Daniel Hillis, "A High-Resolution Imaging Touch Sensor," The International Journal of Robotics Research, vol. 1, No. 2, Jun. 1, 1982, pp. 33-44, downloaded from ijr.sagepub.com at UCLA on Jan. 25, 2012. (13 pages).

Hirsch et al., "BiDi Screen: A Thin, Depth-Sensing LCD for 3D Interaction using Light Fields," ACM SIGGRAPH Asia 2009 papers, vol. 28, No. 5, Dec. 16-19, 2009, Yokohama, Japan. (9 pages).

Fenimore et al., "Coded aperture imaging with uniformly redundant arrays," Applied Optics, vol. 17, No. 3, Feb. 1, 1978, pp. 337-347. (11 pages).

* cited by examiner

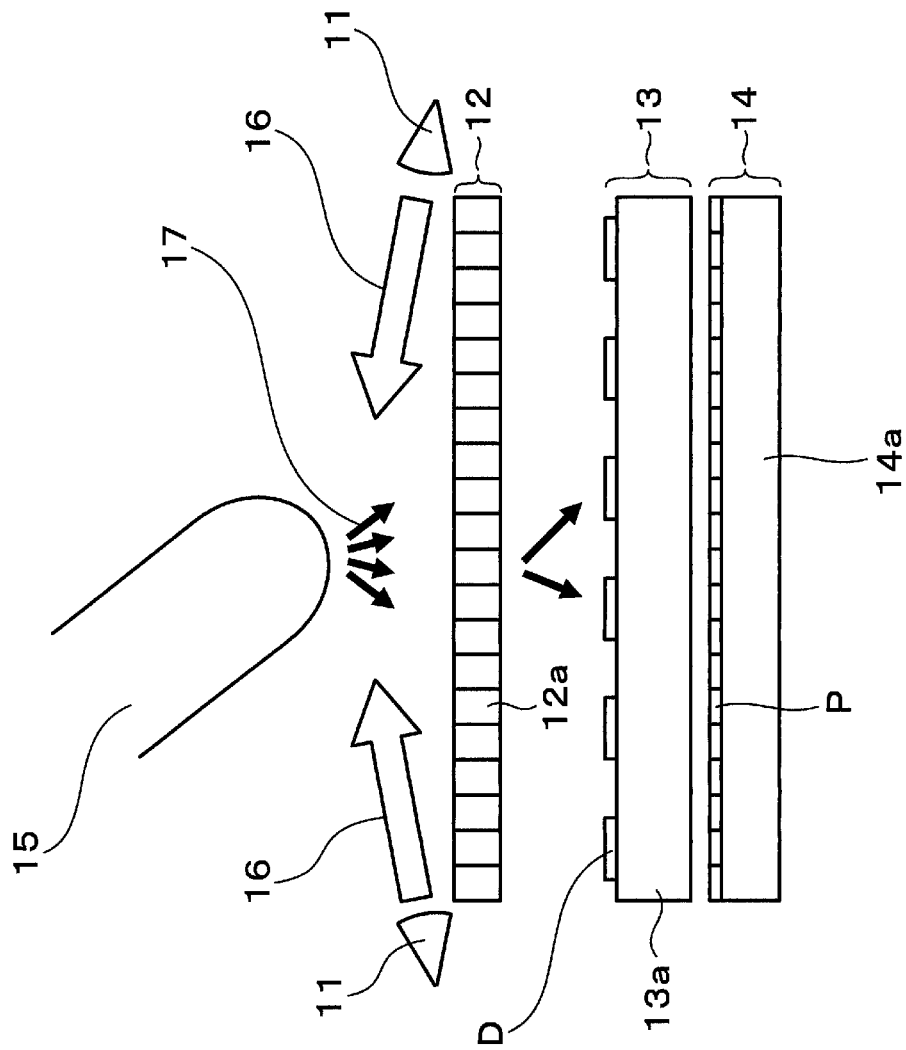

Activated area

THREE-DIMENSIONAL INTERACTIVE DISPLAY

CROSS REFERENCES TO RELATED APPLICATIONS

The present application claims priority to Japanese Priority Patent Application JP 2011-117981 filed in the Japan Patent Office on May 26, 2011, the entire content of which is hereby incorporated by reference.

BACKGROUND

The present disclosure relates to a three-dimensional interactive display, that is, for example, suitable for a flat panel display which enables multi-touch sensing and three-dimensional gesture recognition.

A multi-touch sensing technology for concurrently recognizing plural contact points is widely utilized in a mobile phone, a flat panel display and the like. However, most multi-touch sensing devices in the past such as a capacitive type multi-touch tablet (see, LEE, S., BUXTON, W., AND SMITH, K. C. 1985. A multi-touch three-dimensional touch-sensitive tablet. In ACM SIGCHI, 21-25), and a touch type multi-touch sensor (see, HILLIS, W. D. 1982. A high-resolution imaging touch sensor. Int'l. J. of Robotics Research 1, 2, 33-44) have no ability to detect a gesture distantly-positioned from a screen. Most three-dimensional gesture recognition devices use a camera to obtain space information. However, when the camera is used, it requires a space between the camera and an object to obtain an image. So, the technology is not suitable for a thin or mobile device such as a flat panel television, a tablet, a mobile phone and a portable game device. In most of the related studies (see, Matthew Hirsch, Douglas Lanman et al. A Thin, Depth-Sensing LCD for 3D Interaction using Light Fields, SIGGRAPH Asia, 2009), the multi-touch sensing and the three-dimensional gesture recognition are enabled by using a liquid crystal display (LCD) as a bidirectional mask, whereby the camera behind a diffuser panel of a back light is capable of obtaining the image of the object disposed at a front of the screen. However, the device also requires a relatively wide space between the display and the camera to obtain the image by the camera, and is therefore not suitable for a thin or mobile device. On the other hand, when an image detection surface is disposed behind the back light, it is difficult to utilize a light emitting diode (LED) as the back light. This is because an LED or organic LED (OLED) substrate is generally opaque. Besides, it may be unable to use the display technologies with higher intensity, higher contrast, wider view angle or higher power efficiency such as an OLED display, a plasma display panel (PDP) and an E ink display.

SUMMARY

As described above, there is not proposed in the past a thin three-dimensional interactive display which enables multi-touch sensing and three-dimensional gesture recognition.

Thus, it is desirable to provide a thin three-dimensional interactive display which enables multi-touch sensing and three-dimensional gesture recognition.

According to an embodiment of the present disclosure, there is provided a three-dimensional interactive display including a light source configured to irradiate an object to be detected with a light, a light modulation layer, into which a scattered light generated by irradiating the object with the light from the light source enters, configured to have at least a capability of modulating an intensity of the scattered light, a transparent light-receiving layer configured to receive the light transmitted through the light modulation layer, and a display panel or a back light panel, which is disposed on the opposite side of the transparent light-receiving layer from the light modulation layer.

Typically, the light source generates light having a wavelength that is not overlapped with visible light from a display panel or a back light panel, i.e., ultraviolet light or infrared light. Fundamentally, any kind of light source may be used as long as the light source produces a probe light so that an object approaching to the screen of the three-dimensional interactive display can be detected. The light source desirably generates the light so that the whole space in front of a screen is irradiated. Fundamentally, any kind of light modulation layer can be used as long as the light modulation layer becomes a space filter (mask) against a scattered light, which is generated due to the light from the light source being scattered by the object approaching to the screen. Non-limiting preferred example of the light modulation layer is a liquid crystal panel.

The display panel is not especially limited as long as the image can be displayed, and may be an organic light-emitting diode display panel, a plasma display panel, a liquid crystal display panel or the like.

The transparent light-receiving layer has a light-receiving element array on which one light-receiving element or, typically, plural light-receiving elements are arranged so that the light transmitted through the light modulation layer may be received. Fundamentally, any kind of light-receiving element may be used as long as the light-receiving element can detect the scattered light generated due to the light from the light source being scattered by the object approaching to the screen, and is selected as necessary. Optimally, as the light-receiving element, a light-receiving element which includes a photoconductor containing a complex of a conductive polymer and/or polymer semiconductor and at least one of a protein containing a dye having a long-lived excited state, an organic dye, and an inorganic dye may be used. A plurality of the light-receiving elements is arranged. The light-receiving elements may be disposed on a transparent substrate, but not necessarily so. The light-receiving elements may be disposed behind the light modulation layer.

Typically in the photoconductor described above, the conductive polymer and/or polymer semiconductor and the at least one of a protein, an organic dye, and an inorganic dye are bound to each other via non-covalent or covalent bonds. Typically, the conductive polymer and/or polymer semiconductor forms a network as a whole. The conductive polymer and/or polymer semiconductor is usually p-type, but it may be n-type. The term "long-lived" of the dye having a long-lived excited state contained in the protein refers to a long excitation life common to fluorescent or phosphorescent dyes, and the life is typically tens of picoseconds or more, but is not limited thereto. The protein is at least one protein selected, for example, from the group consisting of electron transfer proteins, coenzyme-containing proteins, globins, fluorescent proteins and variants of the fluorescent proteins. Any known electron transfer protein can be used as the electron transfer protein. More specifically, the electron transfer protein for use may be a metal-containing electron transfer protein or a non-metal-containing (metal-free) electron transfer protein. The metal contained in the electron transfer protein is favorably a transition metal (e.g., zinc or iron) having electrons in the d orbitals or the orbitals of higher energy. As the organic dyes or the inorganic dyes, any known organic dyes or inorganic dyes may be used, and are selected as necessary. Any two or three of proteins, organic dyes, and inorganic dyes may also be used together, if necessary. In order to improve the mechanical strength, the complex of the conductive polymer and/or polymer semiconductor and the proteins, the organic dyes or the inorganic dyes may further contain, as necessary, the other polymers having the higher mechanical strength than that of the conductive polymer and/or polymer semiconductor. In this way, it may become unnecessary to support the photoconductor with a substrate.

Typically, in the light receiving element described above, the conductive polymer and/or polymer semiconductor is electrically connected to first and second electrodes therebetween. The photoconductor and the first and second electrodes may be formed on a substrate for mechanical support, as necessary. The substrate may be transparent or opaque. For example, in order to provide a light-receiving element (which may be considered as a photoelectric conversion element), transparent to visible light, the substrate and the first and second electrodes are made transparent to visible light.

Typically, in the production method for the photoconductor described above, the conductive polymer and/or polymer semiconductor and the at least one of a protein, an organic dye, and an inorganic dye are bound to each other via non-covalent or covalent bonds. The complex of the conductive polymer and/or polymer semiconductor and the protein, the organic dye, or the inorganic dye can be prepared, for example, by using a solution containing the conductive polymer and/or polymer semiconductor and the protein, the organic dye, or the inorganic dye. Alternatively, the complex can be prepared by adding a linker to the solution containing the conductive polymer and/or polymer semiconductor and the protein, the organic dye, or the inorganic dye, thus binding the conductive polymer and/or polymer semiconductor and the protein, the organic dye, or the inorganic dye with the linker and then by using the resulting solution. Yet alternatively, the complex can be prepared by preparing the conductive polymer and/or polymer semiconductor from monomers by electrochemical polymerization of a solution containing the monomers for forming the conductive polymer and/or polymer semiconductor and the dye described above, then adding an apoprotein to the solution, thus forming a protein having the dye in the solution, and then by using the solution. Typically in the production method for the light receiving element, the first and second electrodes are formed on a substrate, the photoconductor is formed on the resulting substrate in such a manner that the conductive polymer and/or polymer semiconductor is electrically connected to the first and second electrodes therebetween.

In the present disclosure described above, when the scattered light generated by irradiating the object approaching to the screen with the light from the light source enters into the light modulation layer, the light modulation layer modulates spatially the light intensity. The spatially modulated light enters into the transparent light-receiving layer, and the light is received. In this way, it is possible to form the image of the object on the light-receiving surface without using a lens. In addition, the distance between the light modulation layer and the transparent light-receiving layer can be much shorter than the case when the image is formed using the lens. When the display panel is used, the image can be displayed on the display panel. When the back light panel is used, the light modulation layer itself may be used as the display panel.

If the light-receiving element is the photoconductor containing the complex of the conductive polymer and/or polymer semiconductor, at least the one of a protein containing a dye having a long-lived excited state, an organic dye, and an inorganic dye, when the light enters into the photoconductor, the dye contained in the protein, or the organic dye or the inorganic dye, absorbs photons to generate electron-hole pairs. The electron-hole pair becomes charge-separated, and one of them be injected out of the protein, the organic dye or the inorganic dye into the conductive polymer and/or polymer semiconductor (photodoping), while the other be localized in the neighborhood of the protein, the organic dye, or the inorganic dye. For example, the hole of the electron-hole pair is injected into the conductive polymer and/or polymer semiconductor, while the electron is localized in the neighborhood of the protein, the organic dye, or the inorganic dye. The conductive polymer and/or polymer semiconductor is electrically connected to the first and second electrodes therebetween. When a bias voltage is applied between the first and second electrodes, the electron or hole injected into the conductive polymer and/or polymer semiconductor transmits through the conductive polymer and/or polymer semiconductor, and photocurrent flows between the first and second electrodes. If the complex of the conductive polymer and/or polymer semiconductor and the proteins is used, polypeptide constituting the protein serves as a barrier to the electrons or holes, preventing disappearance of the electrons or holes generated by the dye contained in one protein and the holes or electrons generated by the dye contained in another protein by recombination. When no light enters into the photoconductor containing the complex of the conductive polymer and/or polymer semiconductor and the protein, the organic dye or the inorganic dye, the photoconductor behaves like an insulator.

According to an embodiment of the present disclosure, it is possible to provide a thin three-dimensional interactive display which enables multi-touch sensing and three-dimensional gesture recognition. Especially when the light-receiving element includes a photoconductor containing a complex of the conductive polymer and/or polymer semiconductor and at least one protein containing a dye having a long-lived excited state, it can prevent recombination of optically excited carriers and disappearance thereof, increase the light-receiving efficiency, and provide the light-receiving element having high sensitivity. It is thus possible to provide a high-performance three-dimensional interactive display by using the favorable light-receiving element to form the transparent light-receiving layer.

These and other objects, features and advantages of the present disclosure will become more apparent in light of the following detailed description of best mode embodiments thereof, as illustrated in the accompanying drawings.

Additional features and advantages are described herein, and will be apparent from the following Detailed Description and the figures.

BRIEF DESCRIPTION OF THE FIGURES

FIG. 1 is a schematic view illustrating a three-dimensional interactive display in a first embodiment;

DETAILED DESCRIPTION

Figure 2A:
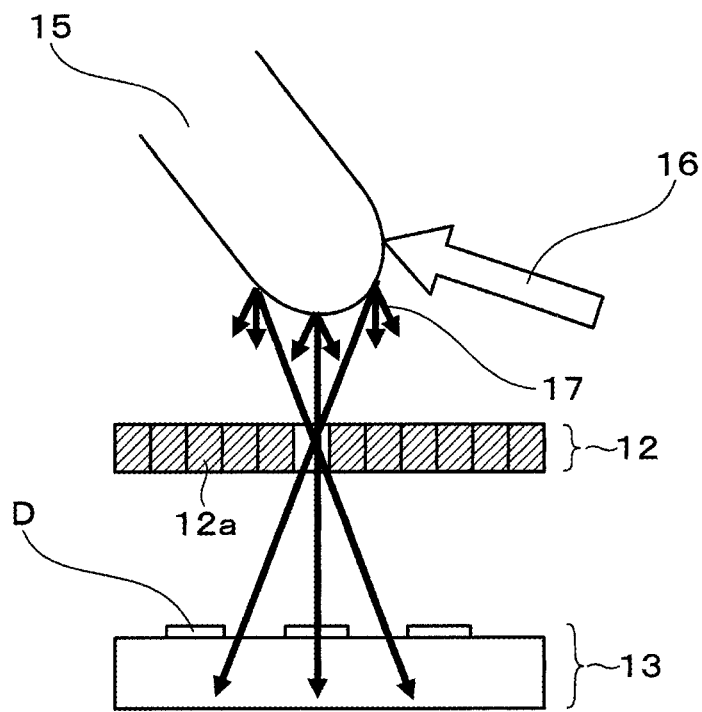
FIGS. 2A and 2B are schematic views illustrating an operational principle of the three-dimensional interactive display in the first embodiment.

Hereinafter, embodiments of the present disclosure will be described with reference to drawings. The embodiments will be described in the following order.
1. First embodiment (three-dimensional interactive display)
2. Second embodiment (three-dimensional interactive display)
3. Third embodiment (three-dimensional interactive display)

1. First Embodiment

Three-Dimensional Interactive Display

FIG. 1 shows a three-dimensional interactive display in a first embodiment.

As shown in FIG. 1, the three-dimensional interactive display includes a light source 11 configured to generate ultraviolet light or infrared light, a light modulation layer 12, a transparent light-receiving layer 13 and a display panel 14.

The light modulation layer 12, the transparent light-receiving layer 13 and the display panel 14 are typically disposed parallel to each other in this order. The light modulation layer 12 and the transparent light-receiving layer 13 are apart from each other at a predetermined distance. The transparent light-receiving layer 13 and the display panel 14 may be directly contacted with each other, or may be apart from each other at a predetermined distance.

The light source 11 is for irradiating an object 15 with a probe light 16 including ultraviolet light or infrared light in order to detect the object 15 approaching to a front of a screen of the three-dimensional interactive display, e.g., a front of the light modulation layer 12. The light source 11 may be a point light source or a line light source, and may be any of a lamp, a light-emitting diode, and a semiconductor laser. The light source 11 is disposed at one or more area of the peripheral of the light modulation layer 12. In order to accurately detect the object 15 approaching to the front of the light modulation layer 12, the light source 11 is most desirably disposed so that the entire face of the front of the light modulation layer 12 is irradiated with the probe light 16, when viewed from a front of the light modulation layer 12. The intensity of the probe light 16 is fundamentally arbitrary, as long as a scattered light 17, generated by irradiating the object 15 with this probe light 16, can transmit through the light modulation layer 12, enter into the transparent light-receiving layer 13 and be detected, but is desirably selected as low as possible.

The scattered light 17 generated by irradiating the object 15 distantly-positioned from the screen with the probe light 16 of ultraviolet light or infrared light can enter into the light modulation layer 12. The light modulation layer 12 functions as a unidirectional or bidirectional mask for spatially modulating the light intensity. In other words, the light modulation layer 12 is a space filter of the scattered light 17 entered into the light modulation layer 12 and the light from the display panel 14. In the light modulation layer 12, cells 12a are arranged in a two-dimensional array, and can control the light transmission/opacity individually by electric signals. The light modulation layer 12 is preferably a liquid crystal panel on which a plurality of liquid crystal cells is disposed in a two-dimensional array. The liquid crystal cell has a pair of polarizing filters including polarizing axes disposed at a right angle to each other, and a liquid crystal interposed therebetween. If the light modulation layer 12 is a liquid crystal panel, the scattered light 17 from the object 15 at the front of the screen of the three-dimensional interactive display or the light from the display panel 14 enters into the light modulation layer 12 and becomes a linear polarized light by one polarizing filter. When the polarized light passes through the liquid crystal, the other polarizing filter having a polarizing axis orthogonal to that of the one polarizing filter inhibits the transmission. Applying an electric field to each liquid crystal cell can arrange liquid crystal molecules within each liquid crystal cell in a specific direction, which enables the rotation of the plane of polarized light of the incident light. Thus, the transmission of each liquid crystal cell can be controlled for the intensity modulation.

The transparent light-receiving layer 13 has a transparent substrate 13a and light-receiving elements D (pixels) arranged in a two-dimensional array thereon. The light-receiving surface is the surface where the light-receiving elements D in the two-dimensional array are formed. The transparent light-receiving layer 13 is for detecting the scattered light 17 including ultraviolet light or infrared light generated when the object 15 at a front of the screen of the three-dimensional interactive display is irradiated with the probe light 16 including ultraviolet light or infrared light. The transmission of the scattered light 17 can be controlled by the light modulation layer 12, thus by the scattered light 17, the image of the object 15 can be formed on the light-receiving surface from different angular directions to each other. In this case; the absorption spectrum of the light-receiving elements D is preferably not overlapped with the light-emitting spectrum of the display panel 14, or, if overlapped, is overlapped at minimum. That is, the absorption spectrum of the light-receiving elements D has an absorption band at the wavelength band of ultraviolet light or infrared light, and On the other hand, the light-emitting spectrum of the display panel 14 has a light-emitting peak at the wavelength band of visible light. Thus, interference between the image formed on the light-receiving elements D (i.e., the light-receiving surface of the transparent light-receiving layer 13) and the image displayed on the display panel 14 can be prevented. The light-receiving elements D will be described below.

The display panel 14 has a substrate 14a and pixels P arranged in a two-dimensional array thereon. The display panel 14 is for displaying an intended image by controlling the pixels P with electric signals. Non-limiting examples of the display panel 14 are an OLED display panel, a plasma display panel (PDP), and a liquid crystal display (LCD) panel. When the liquid crystal display (LCD) is used, a back light is disposed at a rear side thereof. As an example, the display panel 14 is supposed to be a liquid crystal panel. In this case, the light modulation layer 12, e.g., the liquid crystal panel, simply works as a unidirectional light modulator having a function as a mask for controlling the transmission of the scattered light 17 from the object 15. The size and the position of each cell 12a of the light modulation layer 12 may be the same as those of each pixel P of the display panel 14, but not necessarily so. This is because the light modulation layer 12 is for forming the image of the object 15 using the scattered light 17 from the object 15, while the display panel 14 is for simply displaying the image. Therefore, the display panel 14 can be kept at high resolution, while the light modulation layer 12 and the transparent light-receiving layer 13 can be kept at low resolution.

Operation of Three-Dimensional Interactive Display

The light modulation layer 12 and the transparent light-receiving layer 13 can be considered as a unit of a lensless camera. The scattered light 17 from the object 15 at a front of the screen is spatially modulated by the light modulation layer 12, and is received by the transparent light-receiving layer 13 to form an image at the light-receiving surface. An example is shown in FIG. 2A.

Figure 2B:
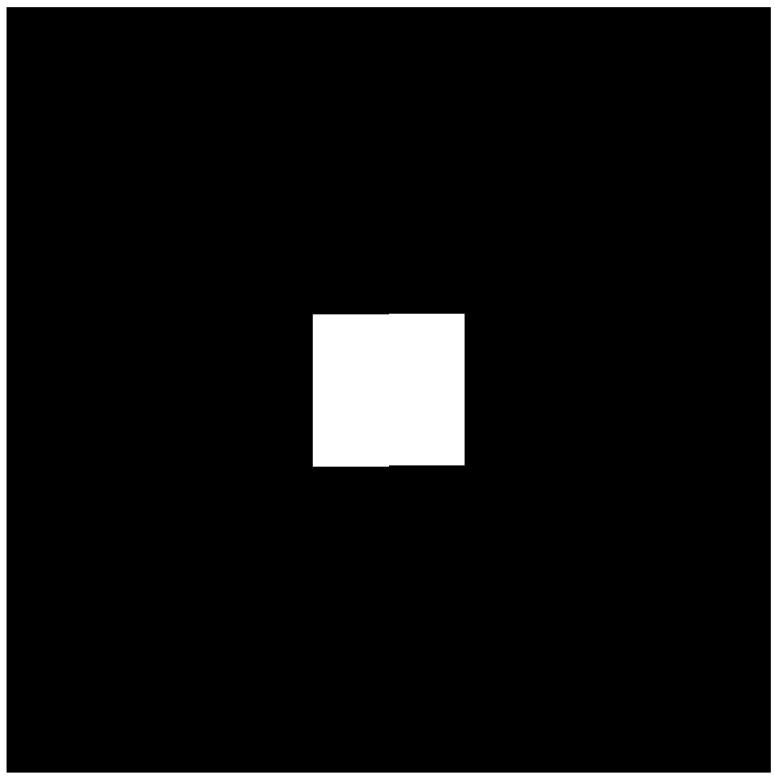

As shown in FIG. 2A, the most simple lens camera is a pinhole camera. By controlling the transmittance of the cells 12a of the light modulation layer 12, a pinhole array, that is to say, a pinhole camera array can be formed. A top view of an example of a pinhole mask is shown in FIG. 2B. As shown in FIG. 2B, only one of the cells 12a is transparent (shown as white in FIG. 2B), while the other cells 12a are opaque (shown as black in FIG. 2B). The pinhole camera array can obtain an image from different angular directions to each other at a front of the three-dimensional interactive display. Thus, a three-dimensional contour of the object 15 can be regenerated. In addition, a three-dimensional gesture of the object 15 (for example, fingers and a palm) can be provided by a pattern recognition algorithm.

Figure 3A:
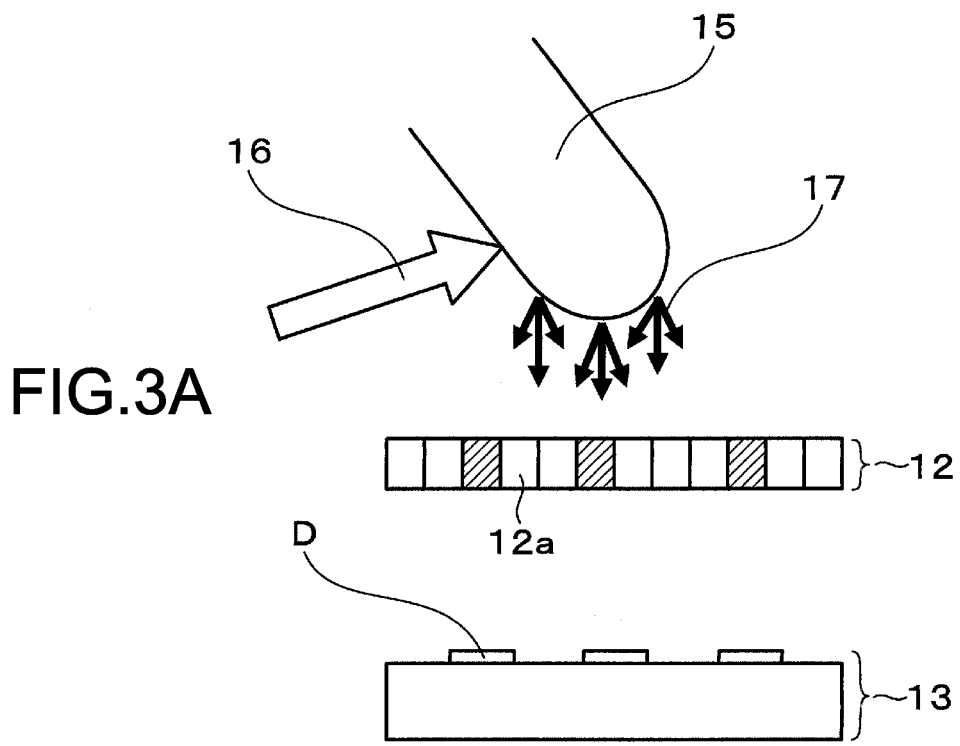
FIGS. 3A and 3B are schematic views illustrating an operational principle of the three-dimensional interactive display in the first embodiment.
Figure 3B:
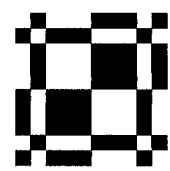

On the other hand, a disadvantage of the use of the pinhole as the mask is that the light modulation layer 12 becomes almost opaque, and interrupts most of the light from the display panel 14. In this respect, it has been found that the improved pinhole camera, i.e., the so-called shield field method, is effective to provide the image while obtaining the relatively large transparent area for displaying the image. An example of the mask pattern is a modified uniformly redundant arrays (MURA), as shown in FIG. 3A, proposed in 1978 (see, Fenimore et al. Codes 1978. Codes aperture imaging with uniformly redundant arrays. Appl. Optics 17, 3, pp 337-347, 2009). FIG. 3B shows an example of a top view of the coded mask. As shown in FIG. 3B, it forms a complex pattern including transparent (shown as white in FIG. 3B) cells 12a and opaque (shown as black in FIG. 3B) cells 12a.

Figure 4:
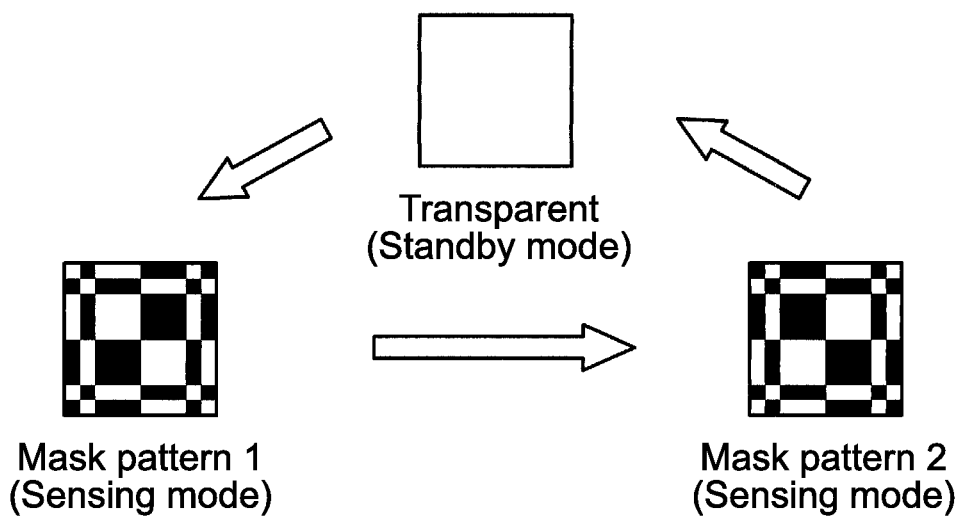
FIG. 4 is a schematic view illustrating an operational principle of the three-dimensional interactive display in the first embodiment.

The patterned mask can significantly increase an aperture ratio to the light from the display panel 14. However, the masked area remains dark. Preferably, in this case, the mask is dynamically modulated. An example of dynamic modulation of the patterned mask is shown in FIG. 4. As shown in FIG. 4, when two mask patterns 1 and 2, which have transparent areas and opaque areas reversed of each other, are switched periodically, a shadow effect in the dark area of the specific pattern can be inhibited.

Then, an energy saving mode of the three-dimensional interactive display panel will be described.

In order to improve the brightness and to save electricity of the three-dimensional interactive display panel, a standby mode can be introduced such that all cells 12a of the light modulation layer 12 are kept transparent. In the standby mode, overall of the light modulation layer 12 is kept transparent. When an object 15 approaches to the screen of the three-dimensional interactive display, the scattered light 17 of ultraviolet light or infrared light, which is generated due to the probe light 16 of ultraviolet light or infrared light from the light source 11 being scattered by the object 15, is detected by the transparent light-receiving layer 13 through the light modulation layer 12. With this, the three-dimensional interactive display immediately switches to a sensing mode shown in FIG. 4. In particular, the standby mode is suitable to reduce a signal processing burden and to save electricity in a mobile device such as a mobile phone. In addition, in the standby mode, the higher brightness can be provided, so the three-dimensional interactive display is suitable to view a video image.

Then, the transparent light-receiving layer 13 will be described in detail.

Figure 5:
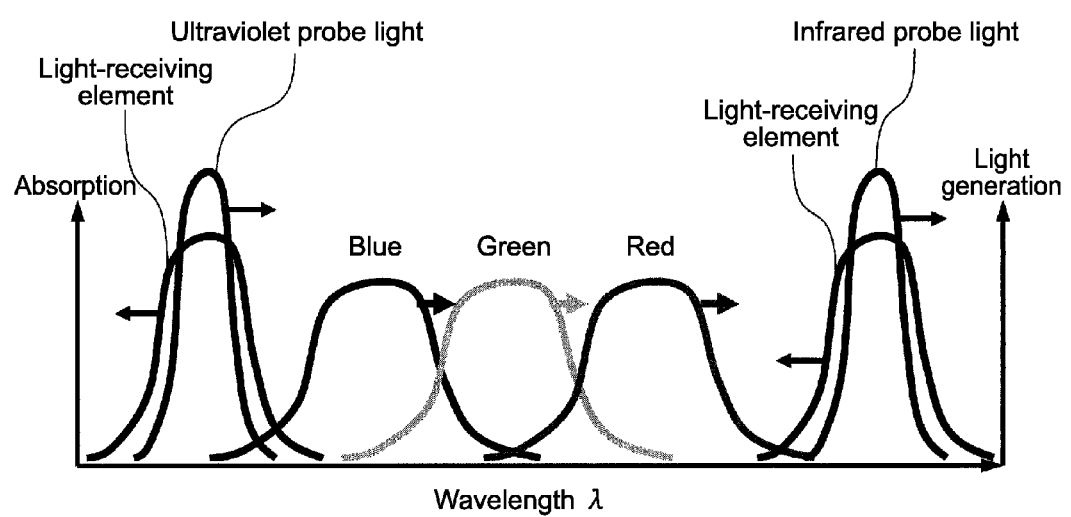
FIG. 5 is a schematic view illustrating an example of an emission spectrum from a display panel and an absorption spectrum of a light-receiving element in a transparent light-receiving layer in the three-dimensional interactive display in the first embodiment.

As mentioned above, in order to prevent the interference with visible light from the display panel 14, the absorption spectrum of the light-receiving elements D is preferably not overlapped with the light-emitting spectrum of the display panel 14, or, if overlapped, is overlapped at minimum. An example of the light-emitting spectrum from the display panel 14 and the absorption spectrum of the light-receiving element D is shown in FIG. 5.

Configuration of Light-Receiving Elements D

Fundamentally, any light-receiving element may be used as the light-receiving element D as long as it can detect ultraviolet light or infrared light. Herein, the light-receiving elements using a novel photoconductor developed by the present inventors will be described.

Photoconductor

Figure 6:
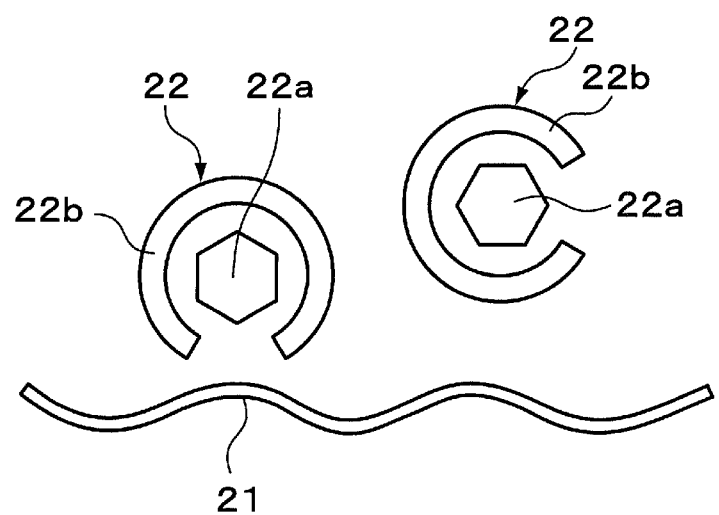
FIG. 6 is a schematic view illustrating a photoconductor used in the light-receiving element in the transparent light-receiving layer in the three-dimensional interactive display in the first embodiment.

FIG. 6 shows the photoconductor in a first example.

As shown in FIG. 6, the photoconductor contains complexes of a network-like conductive polymer and/or polymer semiconductor 21 with one or more proteins 22. The protein 22, which is in a long-lived excited state, is oriented at a predetermined position, as a dye 22a, its emission center, is enclosed in a polypeptide 22b. Usually, the conductive polymer and/or polymer semiconductor 21 and the protein 22 are bound to each other non-covalently or covalently. The non-covalent bond is, for example, a bond by electrostatic interaction, Van der Waals interaction, hydrogen bond interaction or charge transfer interaction. The conductive polymer and/or polymer semiconductor 21 and the protein 22 may be bound to each other via a linker (not shown in the Figure). The entire shape of the photoconductor is not particularly limited and selected properly, as necessary, but it is, for example, in the film or plate shape. The surface shape of the photoconductor is also arbitrary and may be, for example, bent, protruded or irregular (both bent and protruded). Further, the planar shape of the photoconductor is not particularly limited and selected properly, as necessary, but it is, for example, polygonal (triangular, quadrangular, pentagonal, hexagonal or the like), circular or elliptical.

The blending ratio (mass ratio or weight ratio) of the conductive polymer and/or polymer semiconductor 21 to the protein 22 is not particularly limited and selected properly according to the desired photoconductivity of the photoconductor. Generally, the presence of the protein 22 in a greater amount with respect to that of the conductive polymer and/or polymer semiconductor 21 leads to increase in photoconductivity.

The conductive polymer and/or polymer semiconductor 21 may be a p-type or n-type polymer. Conductive polymers are grouped grossly to hydrocarbon-based conductive polymers and hetero atom-containing conductive polymers. Examples of the hydrocarbon-based conductive polymers include polyacetylene, polyphenylene, polyphenylene vinylene, polyacene, polyphenylacetylene, polydiacetylene, polynaphthalene and the like. Examples of the hetero atom-containing conductive polymers include polypyrrole, polyaniline, polythiophene, polythienylene vinylene, polyazulene, polyisothianaphthene and the like.

Examples of the proteins 22 containing a dye 22a, as enclosed in polypeptide 22b, include the following various proteins that are modified to show fluorescence or modified with a fluorescent compound. Derivatives of the following proteins (skeletal amino acid residues being chemically modified) or the variants thereof (part of the skeletal amino acid residues being substituted with other amino acid residues) can also be used.

(1) Cytochrome c's (Electron Transfer Proteins):
cytochrome c, cytochrome $c_1$, cytochrome $c_2$, cytochrome $c_3$, cytochrome $c_4$, cytochrome $c_5$, cytochrome $c_6$, cytochrome $c_7$, cytochrome $c_8$, cytochrome c', cytochrome c", cytochrome cL, cytochrome cM, cytochrome cS, cytochrome $c_{544}$, cytochrome $c_{545}$, cytochrome $c_{546}$, cytochrome $c_{547}$, cytochrome $c_{548}$, cytochrome $c_{549}$, cytochrome $c_{550}$, cytochrome $c_{551}$, cytochrome $c_{551.5}$, cytochrome $c_{552}$, cytochrome $c_{553}$, cytochrome $c_{554}$, cytochrome $c_{555}$, cytochrome $c_{556}$, cytochrome $c_{557}$, cytochrome $c_{558}$, cytochrome $c_{559}$, cytochrome $c_{560}$, cytochrome $c_{561}$, cytochrome $c_{562}$, cytochrome $c_{563}$ and the like.

(2) Cytochrome b's (Electron Transfer Proteins):
cytochrome b, cytochrome $b_1$, cytochrome $b_2$, cytochrome $b_3$, cytochrome $b_4$, cytochrome $b_5$, cytochrome $b_6$, cytochrome $b_7$, cytochrome $b_8$, cytochrome $b_9$, cytochrome $b_{550}$, cytochrome $b_{551}$, cytochrome $b_{552}$, cytochrome $b_{553}$, cytochrome $b_{554}$, cytochrome $b_{555}$, cytochrome $b_{556}$, cytochrome $b_{557}$, cytochrome $b_{558}$, cytochrome $b_{559}$, cytochrome $b_{560}$, cytochrome $b_{561}$, cytochrome $b_{562}$, cytochrome $b_{563}$, cytochrome $b_{564}$, cytochrome $b_{565}$, cytochrome $b_{566}$, cytochrome $b_{567}$, cytochrome $b_{568}$, cytochrome $b_{569}$, cytochrome $P_{450}$ and the like.

(3) Cytochrome a's (Electron Transfer Proteins):

cytochrome a, cytochrome $a_1$, cytochrome $a_2$, cytochrome $a_3$, cytochrome o, cytochrome $o_3$ and the like.

(4) Other Electron Transfer Proteins:

ferredoxin, rubredoxin, plastocyanin, azurin, pseudoazurin, stellacyanin, thioredoxin and the like.

(5) Proteins Containing the Following Coenzymes:

nucleotide-based coenzymes: nicotinamide adenine dinucleotide (NADH), nicotinamide adenine dinucleotide phosphoric acid (NADPH), flavin adenine nucleotide (FADH), flavin mononucleotide (FMN) and the like;

quinone-based coenzymes: ubiquinone, plastoquinone, menaquinone, caldariellaquinone, coenzyme F420, rhodoquinone and the like; and porphyrin-based coenzymes: hem, chlorophyll, pheophytin, chlorin and the like.

(6) Globins:

myoglobin, hemoglobin, neuroglobin, cytoglobin and the like.

(7) Fluorescent Proteins and the Variants:

green fluorescent protein (GFP), DsRed, Kusabira orange, TagBFP (from Evrogen), fruit fluorescent protein from Clontech (http://catalog.takara-bio.co.jp/clontech/product/basic_info.asp?unitid=U100005040), CoralHue series products from MBL (https://ruo.mbl.co.jp/product/flprotein/) and the like.

Examples of the fluorescent compounds include the following fluorescence dyes:

4-Acetamido-4'-isothiocyanatostilbene-2,2'-disulfonic acid

Acridine and derivatives such as acridine, acridine orange, acridine yellow, acridine red and acridine isothiocyanate 5-(2'-aminoethyl)aminonaphthalene-1-sulfonic acid (EDANS)

4-Amino-N-[3-(vinylsulfonyl)phenyl]naphthalimide-3,5-disulfonic acid (lucifer yellow VS)

N-(4-Anilino-1-naphthyl)maleimide

Anthranyl amide

Brilliant yellow

Coumarin and the derivatives thereof such as coumarin, 7-amino-4-methylcoumarin (AMC, coumarin 120) and 7-amino-4-trifluoromethylcouluarin (coumaran 151)

Cyanine and the derivatives thereof such as Cyanosine, Cy3, Cy5, Cy5.5 and Cy7

4',6-Diamidino-2-phenylindole (DAPI)

5',5"-Dibromopyrogallol-sulfonphthalein (bromopyrogallol red)

7-Diethylamino-3-(4'-isothiocyanatophenyl)-4-methylcoumarin

Diethylaminocoumarin

Diethylenetriamine pentaacetate 4,4'-Diisothiocyanatodihydrostilbene-2,2'-disulfonic acid 4,4'-Diisothiocyanato stilbene-2,2'-disulfonic acid 5-[Dimethylamino]naphthalene-1-sulfonyl chloride (DNS, dansyl chloride)

4-(4'-Dimethylaminophenylazo)benzoic acid (DABCYL)

4-Dimethylaminophenylazophenyl-4'-isothiocyanate (DABITC)

Eosin and the derivatives thereof such as eosin and eosin isothiocyanate

Erythrosine and the derivatives thereof such as erythrosine B and erythrosine isothiocyanate Fluorescein and the derivatives thereof such as ethidium, 5-carboxyfluorescein (FAM), 5-(4,6-dichlorotriazin-2-yl)aminofluorescein (DTAF), 2'7'-dimethoxy-4'5'-dichloro-6-carboxyfluorescein (JOE), fluorescein isothiocyanate (FITC), fluorescein chlorotriazinyl, naphthofluorescein and QFITC (XRITC)

Fluorescamine

IR144

IR1446

Green fluorescent protein (GFP)

Coral reef-derived fluorescent protein (RCFP)

Lissamine (trade name)

Lissamine rhodamine, Lucifer yellow

Malachite green isothiocyanate

4-Methylumbelliferone o-Cresolphthalein

Nitrotyrosine

Pararosaniline

Nile red

Oregon green

Phenol red

B-Phycoerythrin o-Phthaldialdehyde

Pyrene and the derivatives thereof such as pyrene, pyrene butyric acid and 1-Pyrenebutyric acid succinimidyl ester Reactive red 4 (Cibacron(trade name) Brilliant Red 3B-A)

Rhodamine and the derivatives thereof such as 6-carboxy-X-rhodamine (ROX), 6-carboxyrhodamine (R6G), 4,7-dichlororhodamine lissamine, rhodamine-B-sulfonyl chloride, rhodamine (Rhod), rhodamine B, rhodamine 123, rhodamine X isothiocyanate, sulforhodamine B, sulforhodamine 101, sulfonyl chloride derivative of sulforhodamine 101 (Texas red), N,N,N',N'-tetramethyl-6-carboxyrhodamine (TAMRA), tetramethylrhodamine and tetramethylrhodamine isothiocyanate (TRITC)

Riboflavin

Rosolic acid and terbium chelate derivatives

Xanthene combinations of the compounds above.

In addition to the compounds above, other fluorescent dyes known to those who are skilled in the art, such as those available from Molecular Probes (Eugene, Oreg., US) and Excitors (Dayton, Ohio, US) or the combinations thereof may be used.

For example for mechanical support of the photoconductor, the photoconductor is formed on a substrate, as necessary. Any known substrate may be used as the substrate, as it is selected properly, as necessary, and it may be a transparent or opaque substrate. The material for transparent substrate is selected properly, as necessary, but it is, for example, a transparent inorganic material such as quartz or glass or a transparent plastic material. A transparent plastic substrate is used favorably as the flexible transparent substrate. Examples of the transparent plastics include polyethylene terephthalate, polyethylene naphthalate, polycarbonate, polystyrene, polyethylene, polypropylene, polyphenylene sulfide, polyvinylidene fluoride, acetylcellulose, brominated phenoxy resins, aramides, polyimides, polystyrenes, polyarylates, polysulfones, polyolefins and the like. For example, a silicon substrate is used as the opaque substrate.

Figure 7:
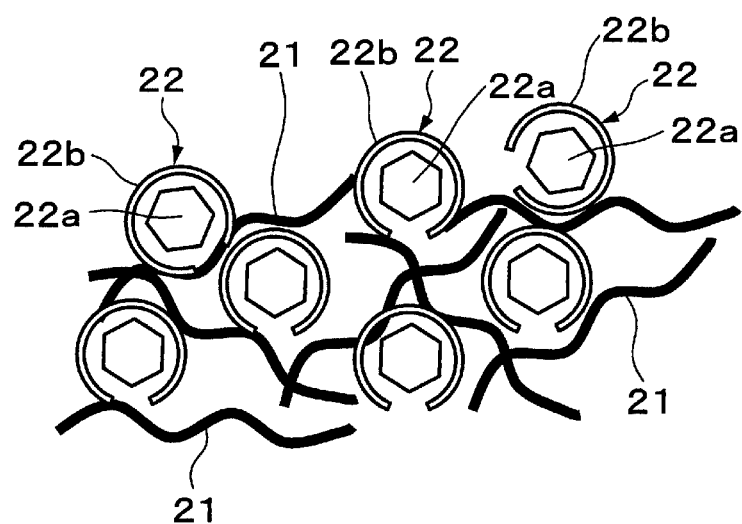
FIG. 7 is a schematic view illustrating a structural example of the photoconductor used in the light-receiving element in the transparent light-receiving layer in the three-dimensional interactive display in the first embodiment.
Figure 8:
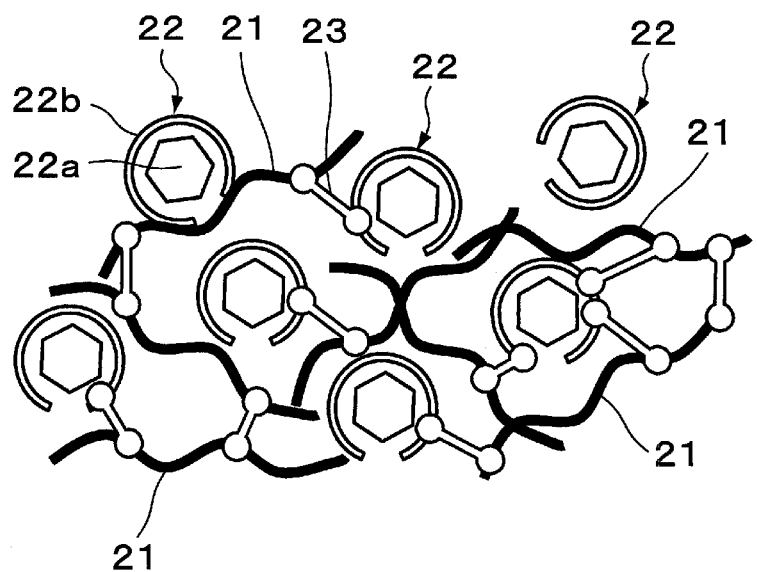
FIG. 8 is a schematic view illustrating another structural example of the photoconductor used in the light-receiving element in the transparent light-receiving layer in the three-dimensional interactive display in the first embodiment.

FIG. 7 shows schematically an example of the state in which the conductive polymer and/or polymer semiconductor 21 and the protein 22 are bound to each other via non-covalent bonds. Alternatively, FIG. 8 shows schematically an example of the state in which the conductive polymer and/or polymer semiconductor 21 and the protein 22 bound to each other via a linker 23.

A known linker, which is selected properly according to the conductive polymer and/or polymer semiconductor 21 and the protein 22, may be used as the linker 23. Specifically, the following linkers can be used.

(1) Those binding the conductive polymer and/or polymer semiconductor 21 to the protein 22 via amine-amine bonds Glutaric aldehyde (reactive group: aldehyde group)

[Chemical Formula 1]

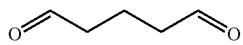

DSG (reactive group: NHS ester, molecular weight: 326.26, spacer arm length: 7.7 Å)

[Chemical Formula 2]

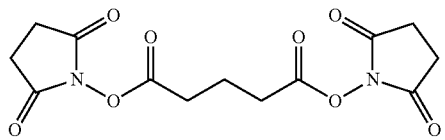

BS(PEG)$_5$, (reactive group: NHS ester, PEG spacer, molecular weight; 532.50)

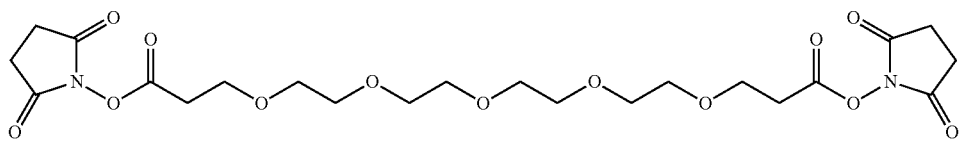

BS(PEG)$_9$ (reactive group: NHS ester, PEG spacer, molecular weight: 708.71)

[Chemical Formula 4]

DSP (reactive group: NHS ester, thiol cleavable, molecular weight: 404.42, spacer arm length: 12.0 Å)

[Chemical Formula 5]

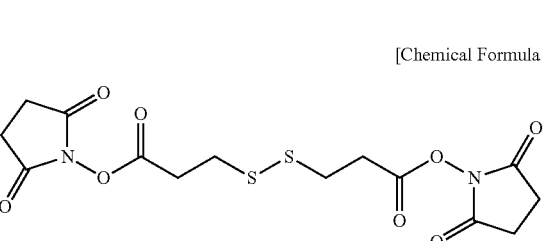

DST (reactive group: NHS ester, misc cleavable, molecular weight: 344.24, spacer arm length: 6.4 Å)

[Chemical Formula 6]

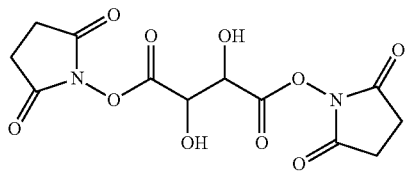

DMA (reactive group: imide ester, molecular weight: 245.15, spacer arm length: 8.6 Å)

[Chemical Formula 7]

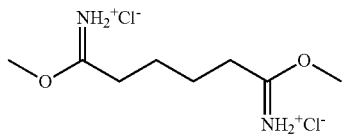

DTBP (reactive group: imide ester, thiol cleavable, molecular weight: 309.28, spacer arm length: 11.9 Å)

[Chemical Formula 8]

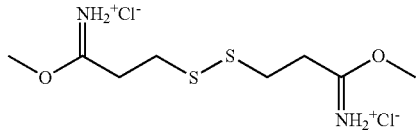

[Chemical Formula 3]

HBVS (vinylsulfone) (molecular weight: 266.38, spacer arm length: 14.7 Å)

[Chemical Formula 9]

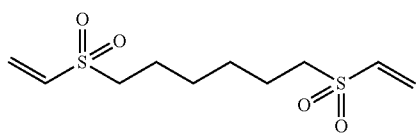

(2) Those binding the conductive polymer and/or polymer semiconductor 21 to the protein 22 with amine-mercapto (or sulfhydryl) bonds BMPS (reactive group: NHS ester/maleimide, molecular weight: 266.21, spacer arm length: 5.9 Å)

[Chemical Formula 10]

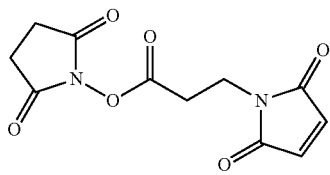

SM(PEG)$_n$ (reactive group: NHS ester/maleimide, PEG spacer, n=2, 4, 6, 8, 12 or 24)

[Chemical Formula 11]

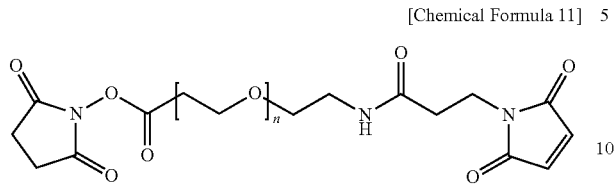

SM(PEG)$_2$ (reactive group: NHS ester/maleimide, PEG spacer)

[Chemical Formula 12]

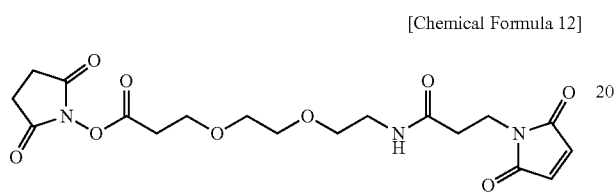

SMPT (reactive group: NHS ester/pyridyldithiol, cleavable, molecular weight: 388.46, spacer arm length: 20.0 Å)

[Chemical Formula 13]

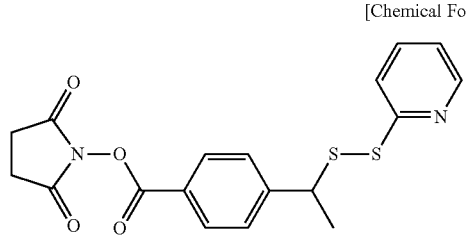

SIA (reactive group: NHS ester/haloacetyl, molecular weight: 283.02, spacer arm length: 1.5 Å)

[Chemical Formula 14]

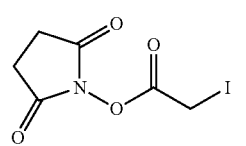

(3) Those binding the conductive polymer and/or polymer semiconductor 21 to the protein 22 via amine-carboxy bonds.

EDC (reactive group: carbodiimide, molecular weight: 191.70)

[Chemical Formula 15]

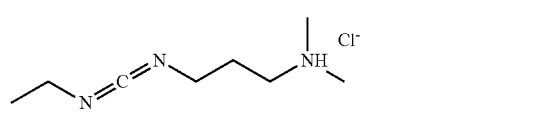

(4) Those binding the conductive polymer and/or polymer semiconductor 21 to the protein 22 with mercapto (or sulfhydryl)-carbohydrate bonds BMPH (reactive group: maleimide/hydrazide, molecular weight: 297.19, spacer arm length: 8.1 Å)

[Chemical Formula 16]

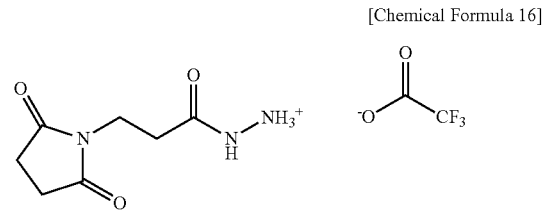

(5) Those binding the polymer network 21 to the protein 22 with hydroxyl-mercapto (or sulfhydryl) bonds PMPI (reactive group: isocyanate/maleimide, molecular weight: 214.18, spacer arm length: 8.7 Å)

[Chemical Formula 17]

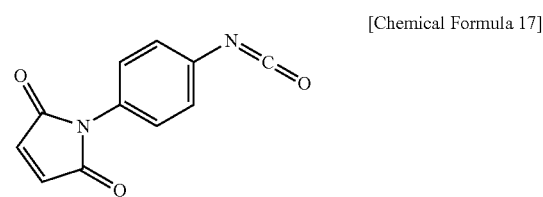 [SMILES: O=C=Nc1ccc(N2C(=O)C=CC2=O)cc1]

For improvement of the mechanical strength of the entire photoconductor, the photoconductor may contain one or more other polymers superior in mechanical strength, as necessary, in addition to the conductive polymer and/or polymer semiconductor 21. In this way, it is not necessary any more to form the photoconductor on a substrate for mechanical support thereof, for improvement in the mechanical strength of the photoconductor. Alternatively in addition to the conductive polymer and/or polymer semiconductor 21, one or more other polymers for viscosity adjustment may be added to the photoconductor for adjustment of the viscosity of the solution or suspension used during preparation of the photoconductor. The polymer for viscosity adjustment should be transparent at any absorption wavelength to the light entering into the photoconductor, should raise the viscosity of the solution or suspension for preparation of the photoconductor when the polymer for viscosity adjustment is added thereto and should be stable in its insulative property. Alternatively, one or more other polymers superior in oxidation and humidity resistances may be blended with the photoconductor, for improvement of the oxidation resistance and humidity resistance of the photoconductor. Examples of the other polymers used for these purposes include, but are not limited to, polyethylene terephthalate (PET), polymethyl methacrylate (PMMA), polystyrene (PS), poly-4-vinylphenol (PVP) and the like.

Production Method for Photoconductor

The production method for the photoconductor will be described.

For production of the photoconductor shown in FIG. 7, first, a conductive polymer and/or polymer semiconductor 21 and a protein 22 are dissolved and mixed in a solvent. The solvent for use may be, for example, water or an organic solvent and is selected properly, as necessary. The solution thus obtained is applied on a substrate. The application methods include, for example, dip coating, spin coating, bar coating, inkjet printing and the like, and a suitable method is selected, as necessary. The surface shape of the substrate is arbitrary and may be flat or curved. The solvent is then removed by vaporization from the substrate, thus giving a photoconductor on the substrate.

For production of the photoconductor shown in FIG. 8, a conductive polymer and/or polymer semiconductor 21 and a protein 22 are first dissolved and mixed in a solvent. When other polymers are used with the conductive polymer and/or polymer semiconductor 21, the other polymers are also mixed with the solution. The solvent for use may be, for example, water or an organic solvent and is selected properly, as necessary. A linker 23 is then added to the solution thus obtained, making the conductive polymer and/or polymer semiconductor 21 and the protein 22 bound to each other via covalent bonds and precipitated with the linker 23. The unreacted linker 23, the conductive polymer and/or polymer semiconductor 21 and the protein 22 remaining unreactive with the linker 23 are then removed, to give a photoconductor formed on the substrate.

Figure 9:
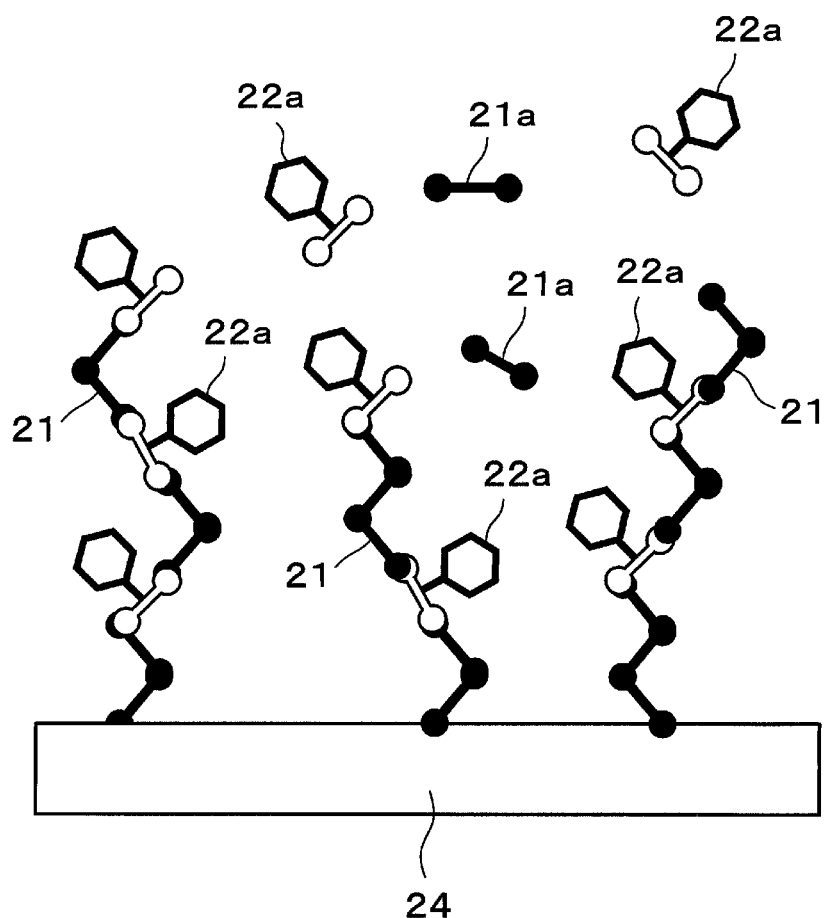
FIG. 9 is a schematic view explaining an example of a method of producing the photoconductor used in the light-receiving element in the transparent light-receiving layer in the three-dimensional interactive display in the first embodiment.
Figure 10:
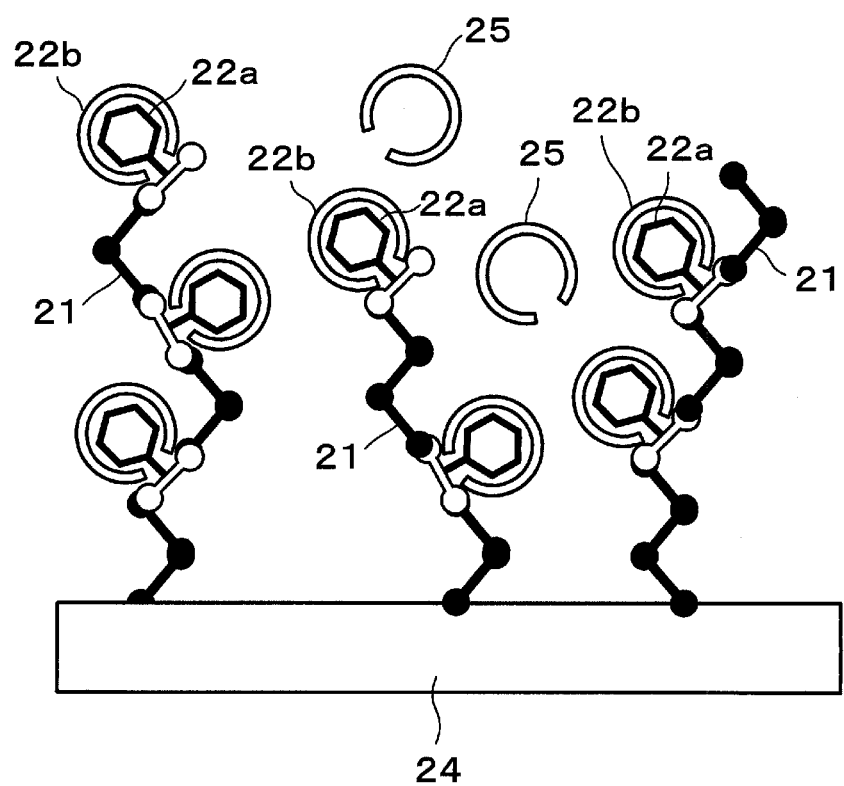
FIG. 10 is a schematic view explaining an example of a method of producing the photoconductor used in the light-receiving element in the transparent light-receiving layer in the three-dimensional interactive display in the first embodiment.

The photoconductor shown in FIG. 7 can also be prepared in the following manner: In this production method, the conductive polymer and/or polymer semiconductor 21 is prepared by an electrochemical polymerization method (electrolytic polymerization method). Specifically, first as shown in FIG. 9, a monomer 21a and dyes 22a for preparation of a conductive polymer and/or polymer semiconductor 21 and a dye 12a are dissolved and mixed in a solvent. A conductive polymer and/or polymer semiconductor 21 prepared from the monomers 21a by polymerization is formed on a surface of an electrode 24 by potential sweep, as the electrode 24 (working electrode) is immersed in the solution thus obtained, and the dyes 22a are then bound to the conductive polymer and/or polymer semiconductor 21. Then as shown in FIG. 10, an apoprotein (polypeptide) 25 is mixed with the polymer solution thus obtained. The dye 22a is enclosed in the apoprotein 25 by refolding thereof, as the condition of the polymer solution (pH, temperature, etc.) is adjusted, giving a protein 22 containing the dye 22a, as enclosed in the polypeptide 21a. The solvent and the unreacted monomers 21a are then removed, to give a photoconductor formed on the electrode 24.

Figure 11:
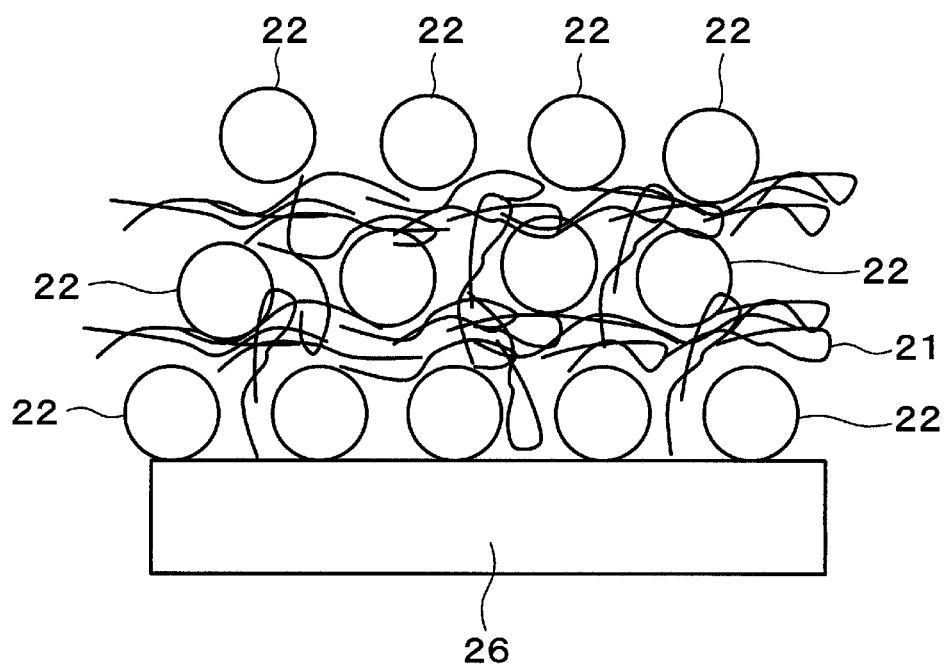
FIG. 11 a schematic view illustrating another example of the photoconductor used in the light-receiving element in the transparent light-receiving layer in the three-dimensional interactive display in the first embodiment.

FIG. 11 shows the photoconductor in a second example.

As shown in FIG. 11, the photoconductor contains the composite of a multilayer laminated protein 22 and a network-like conductive polymer and/or polymer semiconductor 21 formed on a substrate 26. Although a 3-layer laminate of protein 22 layers is shown as an example in FIG. 11, the lamination number of the protein 22 layer is not limited to 3 and selected properly, as necessary. The substrate 26 is selected properly, as necessary.

Examples of the conductive polymer and/or polymer semiconductor 21, the protein 22 and the substrate 26 are shown below: The conductive polymer and/or polymer semiconductor 21 is, for example, p-type polyanilinesulfonic acid (PASA)

[Chemical Formula 18]

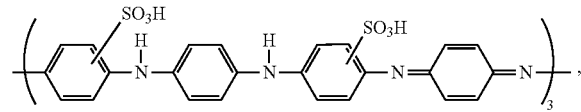

poly[2-methoxy-5-(2'-ethyl-hexyloxy)-1,4-phenylene vinylene] (MEH-PPV)

[Chemical Formula 19]

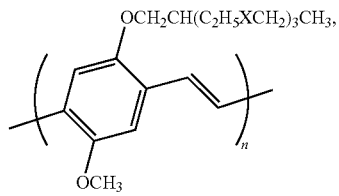

or poly(3-hexylthiophene) (P3HT)

[Chemical Formula 20]

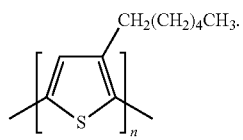

The n-type conductive polymer and/or polymer semiconductor for use may be, for example, poly(p-pyridyl vinylene) poly(isothianaphthene). An example of the protein 22 is zinc-substituted cytochrome c. An example of the substrate 26 is an indium-tin mixed oxide (ITO) substrate.

Production Method for Photoconductor

The production method for the photoconductor will be described below.

A polymer solution containing a conductive polymer and/or polymer semiconductor 21 in a solvent and a protein solution containing a protein 22 in the same solvent are prepared (for example, respectively at pH 5.0). The solvent for use may be, for example, water or an organic solvent and is selected properly, as necessary.

First, a first layer of the protein 22 is formed on the substrate 26, as the substrate 26 is immersed in the protein solution or coated with the protein solution and then the solvent is removed. Subsequently, the substrate 26 carrying the first layer protein 22 is immersed in the polymer solution or applied with the polymer solution. Electrostatic attractive force is then formed between the surface charge on the first layer protein 22 and the charge on the conductive polymer and/or polymer semiconductor 21 in the region carrying the charge opposite in polarity to the first layer, and the protein 22 and the conductive polymer and/or polymer semiconductor 21 are bound to each other by the electrostatic attractive force.

Subsequently after removal of the solvent, the substrate 26 having the first layer protein 22 and the conductive polymer and/or polymer semiconductor 21 layer formed thereon is additionally immersed in the protein solution, or applied with the protein solution. Electrostatic attractive force is generated then between the surface charge on the conductive polymer and/or polymer semiconductor 21 layer formed on the substrate 26 and the charge of the oppositely charged protein 22 layer, and the conductive polymer and/or polymer semiconductor 21 and the protein 22 thereon are bound to each other by the electrostatic attractive force. Subsequently after removal of the solvent, the conductive polymer and/or polymer semiconductor 21 is additionally formed similarly. The process is repeated for necessary times, forming a laminate having a desired number of the layers of the conductive polymer and/or polymer semiconductor 21 and the protein 22.

Figure 12:
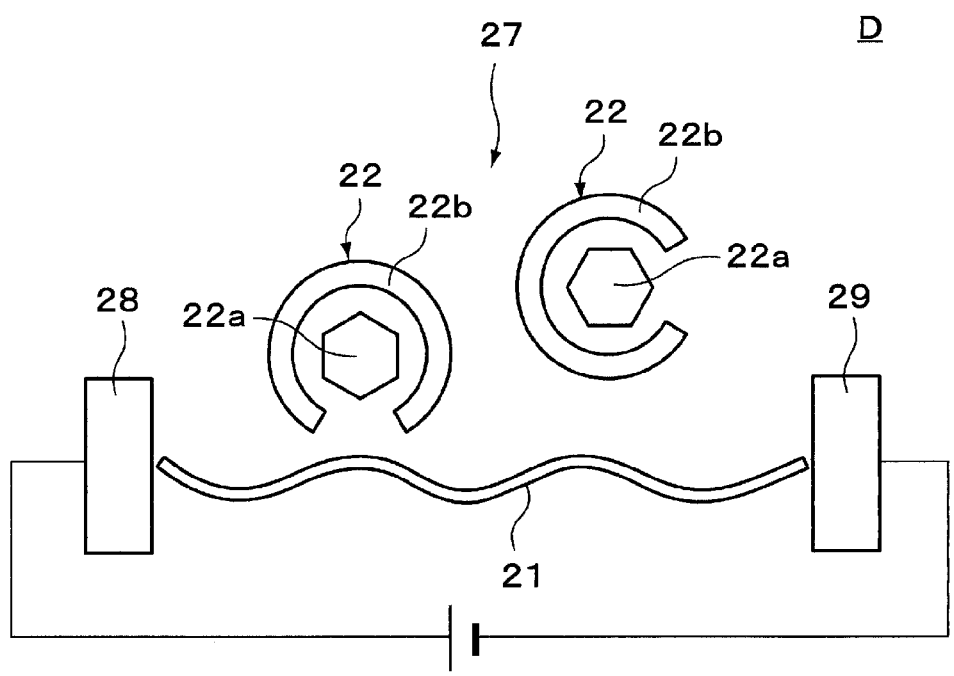
FIG. 12 is a schematic view illustrating the light-receiving element in the transparent light-receiving layer in the three-dimensional interactive display in the first embodiment.

FIG. 12 shows the light-receiving element D using the novel photoconductor.

As shown in FIG. 12, in the light-receiving element D, the network-like conductive polymer and/or polymer semiconductor 21 in the photoconductor 27 is electrically connected to a first electrode 28 and a second electrode 29 at positions different from each other. For example, the photoconductor 27 is formed as it is formed both over the first electrode 28 and the second electrode 29, and the conductive polymer and/or polymer semiconductor 21 is electrically connected to the first electrode 18 and the second electrode 29 at positions where the photoconductor 27 is in contact with the first electrode 28 and the second electrode 29. The distance between the first electrode 28 and the second electrode 29 is not particularly limited, and is selected properly, as necessary, but it is, for example, 1 µm or more and 30 µm or less, typically 5 µm or more and 20 µm or less, for example 10 µm. Any known conductive material may be used as the material for the first electrode 28 and second electrode 29 and it is selected, as necessary. An example thereof for use is a pure metal or alloy, of at least one metal selected from the group consisting of copper (Cu), silver (Ag), aluminum (Al), chromium (Cr), gold (Au), iron (Fe), nickel (Ni), titanium (Ti) and platinum (pt). In the case of the first electrode 28 and the second electrode 29 being formed transparent, examples of the transparent electrode materials for use include transparent metal oxides such as ITO (indium tin mixed oxide), FTO (fluorine-doped tin oxide) and NESA glass ($SnO_2$ glass); ultrathin metal films, such as Au film, that permit light transmission and the like. When the first electrode 28 and the second electrode 29 are formed transparent and the substrate is used in the following manner, it is possible to obtain a transparent light-receiving element by making the substrate transparent.

For example for mechanical support of the light-receiving element D, the light-receiving element D is formed on a substrate, as necessary. Specifically, a photoconductor 27, a first electrode 28 and a second electrode 29 are formed on a substrate. Any known substrate may be used as the substrate, as it is selected as necessary, and it may be a transparent or opaque substrate. The material for transparent substrate is selected properly, as necessary, and it is, for example, a transparent inorganic material, such as quartz or glass, or a transparent plastic material. A transparent plastic substrate is used as the flexible transparent substrate. Examples of the transparent plastics include polyethylene terephthalate, polyethylene naphthalate, polycarbonate, polystyrene, polyethylene, polypropylene, polyphenylene sulfide, polyvinylidene fluoride, acetylcellulose, brominated phenoxy resins, aramides, polyimides, polystyrenes, polyarylates, polysulfones, polyolefins and the like. For example, a silicon substrate is used as the opaque substrate.

Figure 13:
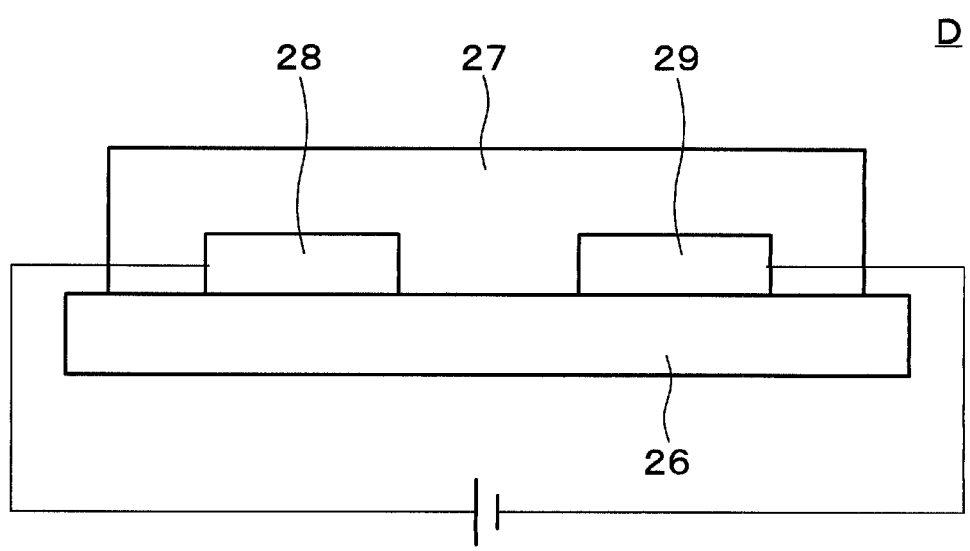
FIG. 13 is a schematic view illustrating a specific configuration example of the light-receiving element in the transparent light-receiving layer in the three-dimensional interactive display in the first embodiment.

FIG. 13 shows a typical example of the configuration of the light-receiving element D. As shown in FIG. 13, in the light-receiving element, a first electrode 28 and a second electrode 29 are formed, as separated from each other, on a substrate 26 and a photoconductor 27 is formed over both of the first electrode 28 and the second electrode 29.

Production Method for Light-Receiving Element D

The production method for the light-receiving element D will be described below.

First, a first electrode 28 and a second electrode 29 are formed on a substrate 26. For example for preparation of the first electrode 28 and second electrode 29, a film of a conductive material is formed and patterned on the substrate 26 by lithography and etching.

Then, a photoconductor 27 is formed on the substrate 26 carrying the first and second electrodes in a manner similar described above.

Thus, a desired light-receiving element D is produced.

Operation of Light-Receiving Element D

Operation of the light-receiving element D will be described below with reference to FIG. 13.

In the light-receiving element D when it is not irradiated with light (in dark state), the conductive polymer and/or polymer semiconductor 21 and the protein 22 constituting the photoconductor 27 are both insulators, and thus the photoconductor 27 is an insulator.

On the other hand, when the photoconductor 27 of the light-receiving element D is irradiated with light having photon energy sufficient for excitation of the dye 22a of protein 22, the dye 22a is excited, giving electron-hole pairs (excitons). The electrons or holes of the electron-hole pairs thus generated are injected from the dye 22a into the conductive polymer and/or polymer semiconductor 21 through routes formed in the protein 22 (photodoping). When electrons or holes are injected in this way, the conductivity of the conductive polymer and/or polymer semiconductor 21 increases rapidly and the conductivity of the photoconductor 27 also increases rapidly. When a bias voltage is applied between the first electrode 28 and the second electrode 29, the holes or electrons injected into the conductive polymer and/or polymer semiconductor 21 move to the first electrode 28 or second electrode 29 that is lower or higher in electric potential, causing flow of the photocurrent between the first electrode 28 and the second electrode 29. For example when the bias voltage is applied between the first electrode 28 and the second electrode 29 so that the first electrode 28 becomes higher in electric potential, the holes injected into the conductive polymer and/or polymer semiconductor 21 move to the second electrode 29, causing flow of the photocurrent from the first electrode 28 to the second electrode 29. The amount of the photocurrent increases when the intensity of the light irradiated to the photoconductor 27 increases. When no bias voltage is applied between the first electrode 28 and the second electrode 29 (bias voltage=0), no photocurrent flows between the first electrode 28 and the second electrode 29 even if the photoconductor 27 is irradiated with light. The direction of the photocurrent flowing between the first electrode 28 and the second electrode 29 can be controlled by the polarity of the bias voltage applied between the first electrode 28 and the second electrode 29. When the intensity of the light entering into the photoconductor 27 is constant, the photocurrent flowing between the first electrode 28 and the second electrode 29 can be controlled by the wavelength of the incident light and the bias voltage applied between the first electrode 28 and the second electrode 29.

In this case, because the proteins 22 are insulated from each other by the shell polypeptides 22b, recombination of the electrons and the holes between the proteins 22 and disappearance thereof can be prevented. It is thus possible to increase the contribution to the photocurrent significantly by the electron-hole pairs generated in the dye 22a by the incident light to the photoconductor 27. It is also possible to reduce the amount of the leak current (dark current) flowing between the first electrode 28 and the second electrode 29 significantly in the dark state in which no light is irradiated to the photoconductor 27.

Photocurrent Generation Test of Light-Receiving Element D

A light-receiving element D was prepared for photocurrent generation test.

Figure 14:
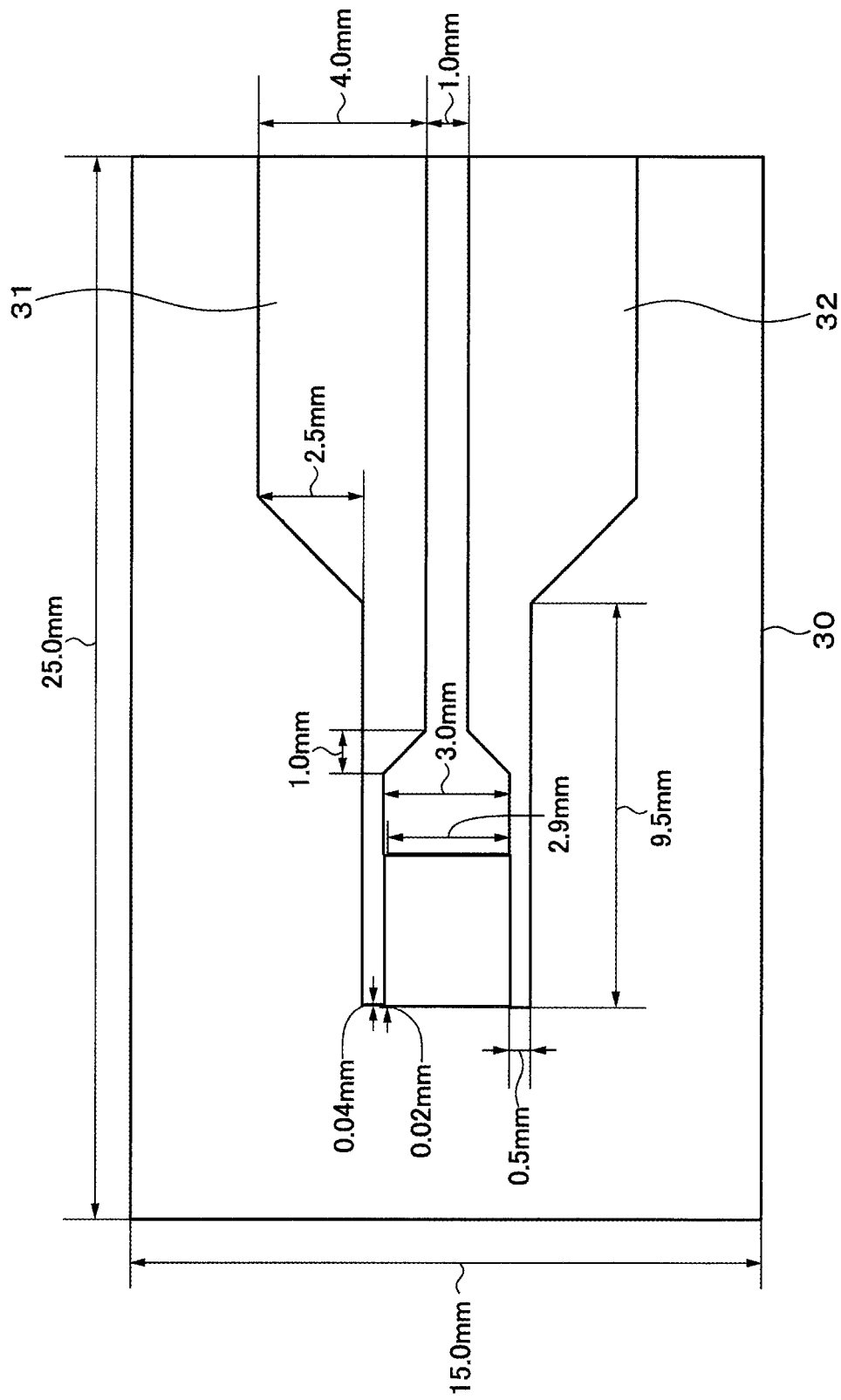
FIG. 14 is a top view illustrating the light-receiving element used in a photocurrent-generating test.
Figure 15:
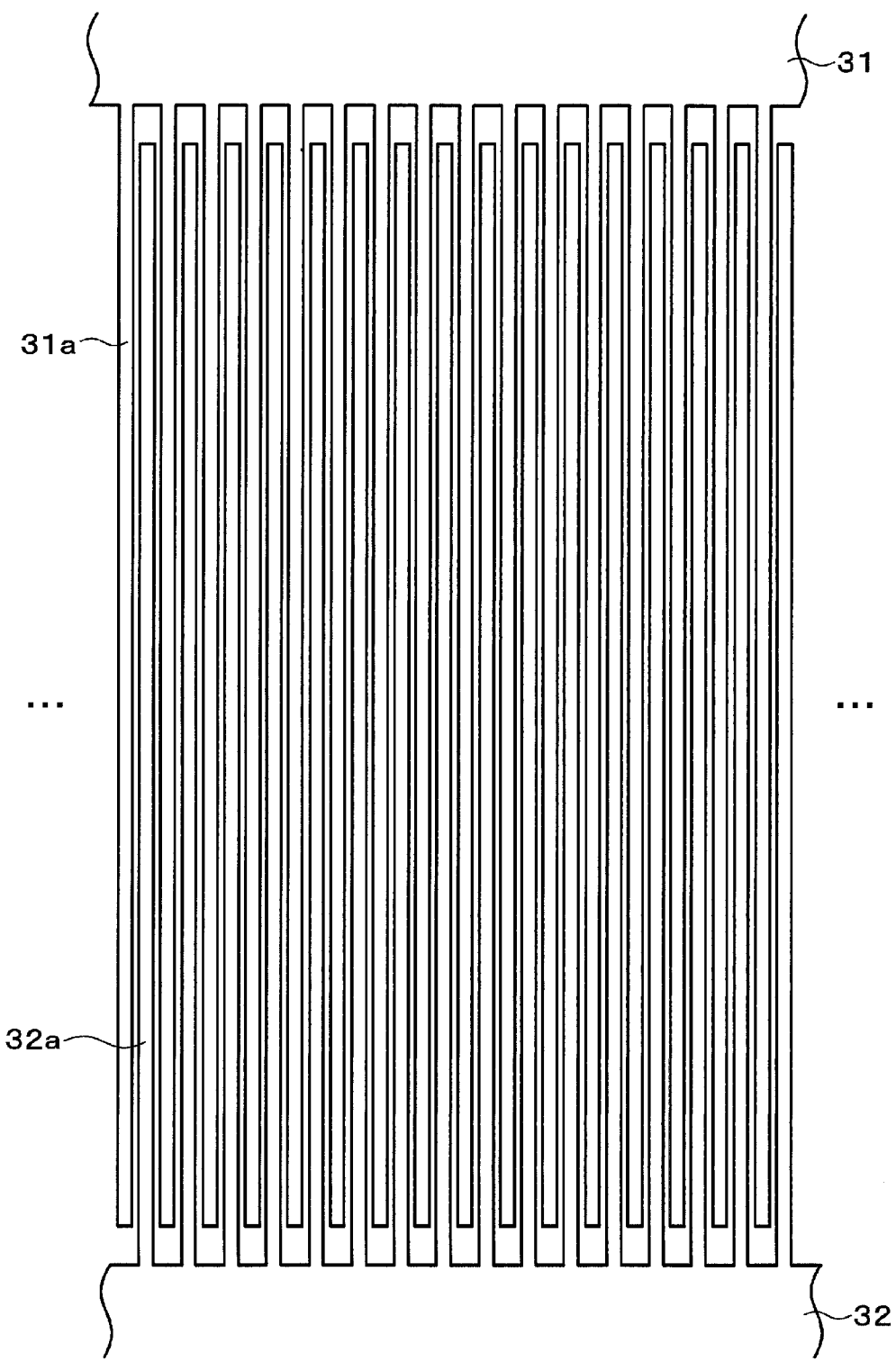
FIG. 15 is an expanded top view illustrating a comb-shaped electrode region of the light-receiving element shown in FIG. 14.

The light-receiving element D was prepared in the following manner:

As shown in FIG. 14, a pair of ITO electrodes 31 and 32 in a predetermined shape was formed on a glass substrate 30 having a size of 15 mm×25 mm and a thickness of 1 mm. The ITO electrodes 31 and 32 correspond to the first electrode 28 and the second electrode 29. The dimension of the ITO electrodes 31 and 32 is as shown in FIG. 14. The thickness of the ITO electrodes 31 and 32 is 100 nm. As shown in FIG. 15, the ITO electrodes 31 and 32 have respectively comb-shaped electrode regions 31a and 32a in the terminal regions, and these comb-shaped electrode regions 31a and 32a are placed at positions facing each other at a predetermined distance, as they are engaged with each other. The electrode pitch in each of the comb-shaped electrode regions 31a and 32a is 20 μm, and the distance between the electrodes is 10 μm. The total area of the comb-shaped electrode regions 31a and 32a is 4 mm×4 mm(=16 mm²).

The central metal iron of the equine cardiac muscle cytochrome c is substituted with zinc, to give a zinc-substituted cytochrome c. The zinc-substituted cytochrome c was dissolved in water, to give 0.73 mM protein solution. Separately, polyanilinesulfonic acid (PASA) was dissolved in water, to give 5.1 mg/mL PASA solution.

The PASA solution thus prepared was neutralized with sodium hydroxide (NaOH), to give a PASA sodium salt solution. The PASA sodium salt is represented by the following Formula:

[Chemical Formula 21]

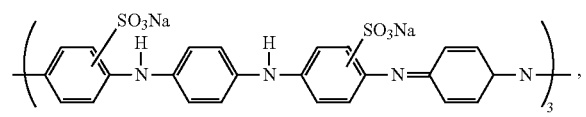

The PASA sodium salt solution thus prepared was then added to the protein solution, to give an aqueous protein-polymer solution. The weight ratio of the zinc-substituted cytochrome c to PASA sodium salt in the aqueous protein-polymer solution is 10:1. The concentration of the zinc-substituted cytochrome c in the aqueous protein-polymer solution was approximately 0.6 mM. The aqueous protein-polymer solution thus prepared was then applied on the comb-shaped electrode regions 31a and 32a by dipping method. After dipping, the ITO electrodes 31 and 32 were held under vacuum for approximately 3 hours for removal of water. The ITO electrodes 31 and 32 were then stored in a drying container overnight before the test.

Figure 16:
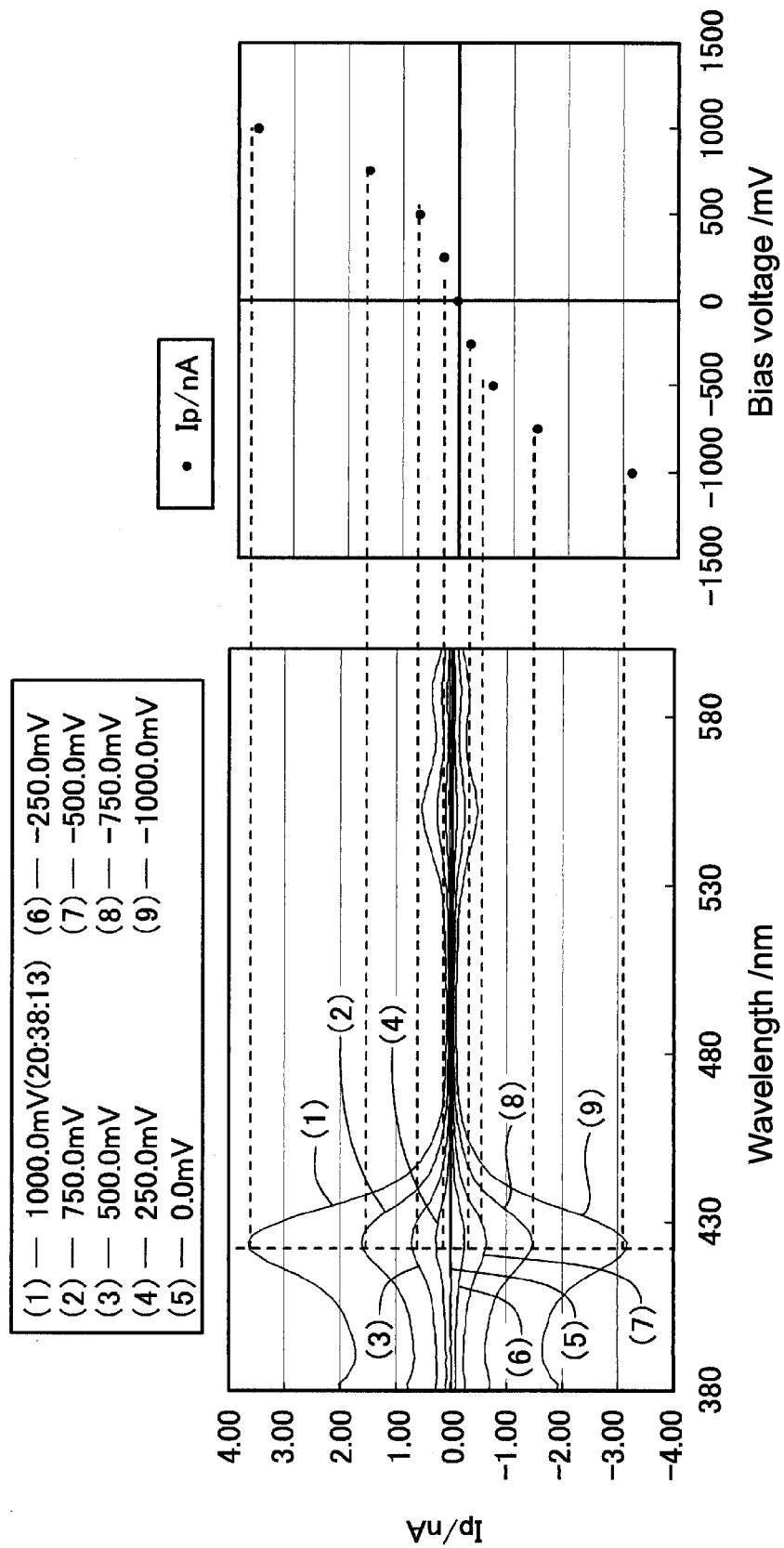
FIGS. 16A and 16B are schematic charts showing the results of measuring the photocurrent action spectrum of the light-receiving element shown in FIG. 14 and also showing the bias voltage dependence of photocurrent.

The photocurrent action spectrum of the light-receiving element was determined at a wavelength of 380 to 600 nm at room temperature. The voltage applied between the ITO electrodes 31 and 32 was changed from −1000 mV to +1000 mV at an interval of 250 mV. The photocurrent action spectrum obtained is shown in FIG. 16A. The maximum values of the photocurrent action spectrum are found at wavelengths of 408, 540 and 578 nm, similarly to the absorption spectrum of the zinc-substituted cytochrome c solution, indicating that the change in conductivity is caused by the zinc-substituted cytochrome c. The wavelength of 408 nm is an ultraviolet edge wavelength within the visible light waveband. Dependence of the photocurrent $I_p$ on a bias voltage when the wavelength was left constant at 408 nm is shown in FIG. 16B. The bias voltage dependence shown in FIG. 16B shows the property of the photoconductor. The bias voltage dependence shown in FIG. 16B also shows that the sensitivity of the light-receiving element to light can be altered by adjustment of the bias voltage. It is thus possible to prevent saturation of the amplifier, for example, by increasing the sensitivity by increase of a bias voltage for detection of weak light and decreasing the sensitivity by decrease of a bias voltage alternatively for detection of strong light. The peaks of the wavelengths of 540 and 578 nm are in within the visible wavelengths. These peaks can be ignored by setting a predetermined threshold current when the photocurrent is detected.

A comparative test was performed for examination of the advantages of using a dye 22a-containing protein 22 in the photoconductor 27. For the purpose, a sample containing the complex of a conductive polymer and/or polymer semiconductor 21 and a dye 22a formed on comb-shaped electrode regions 31a and 32a (sample 1) and a sample containing the complex of a conductive polymer and/or polymer semiconductor 21 and a protein 22 formed on comb-shaped electrode regions 31a and 32a (sample 2) were prepared.

The sample 1 containing the complex of a conductive polymer and/or polymer semiconductor 21 and a dye 22a formed on comb-shaped electrode regions 31a and 32a was prepared in the following manner:

A dye 22a, zinc protoporphyrin (ZPP), was dissolved in 1-methyl-2-pyrrolidone (NMP), to give 2 mg/mL dye solution. Separately, polyaniline (PANI) was dissolved in NMP, to give 2 mg/mL PANI solution. Then, the PANI solution was added to the dye solution, to give an aqueous dye-polymer solution. The weight ratio of ZPP to PANI in the aqueous dye-polymer solution is 10:1. The aqueous dye-polymer solution thus prepared was then diluted to a PANI concentration of 0.24 mg/mL and the resulting solution was applied on comb-shaped electrode regions 31a and 32a by dipping method. After dipping, the ITO electrodes 31 and 32 were held under vacuum for 48 hours for removal of water and NMP. The ITO electrodes 31 and 32 were then stored in a drying container overnight before test.

The sample 2 containing the complex of a conductive polymer and/or polymer semiconductor 21 and protein 22 formed on comb-shaped electrode regions 31a and 32a was prepared in the following manner:

Zinc-substituted cytochrome c was dissolved in water, to give 0.73 mM protein solution. Separately, polyaniline (PANI) was dissolved in NMP, to give 2 mg/mL PANI solution. The PANI solution was then added to the protein solution, to give an aqueous protein-polymer solution. The weight ratio of the zinc-substituted cytochrome c to PANI in the aqueous protein-polymer solution is 10:1. The aqueous protein-polymer solution thus prepared was then diluted to a PANI concentration of 0.24 mg/mL and the resulting solution was applied on comb-shaped electrode regions 31a and 32a by dipping method. After dipping, the electrodes were held under vacuum for 48 hours for removal of water and NMP. The ITO electrodes 31 and 32 were then stored in a drying container overnight before test.

Figure 17:
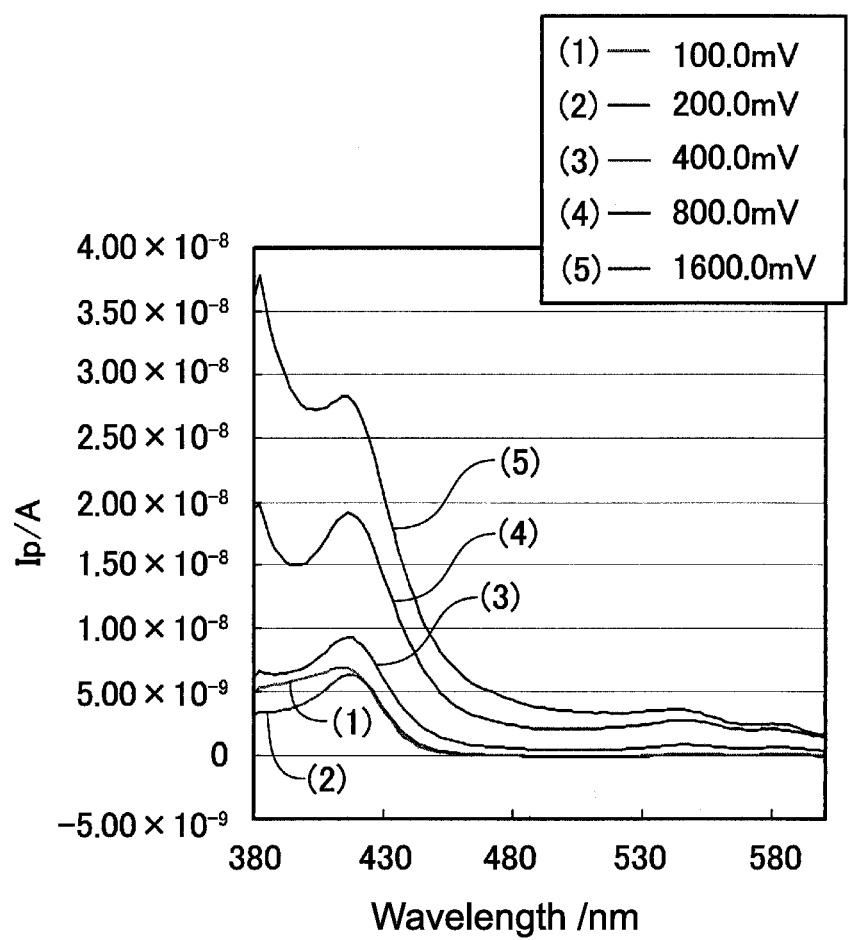
FIG. 17 is a schematic chart showing the results of measuring the photocurrent action spectrum of the complex of zinc protoporphyrin and polyaniline.
Figure 18:
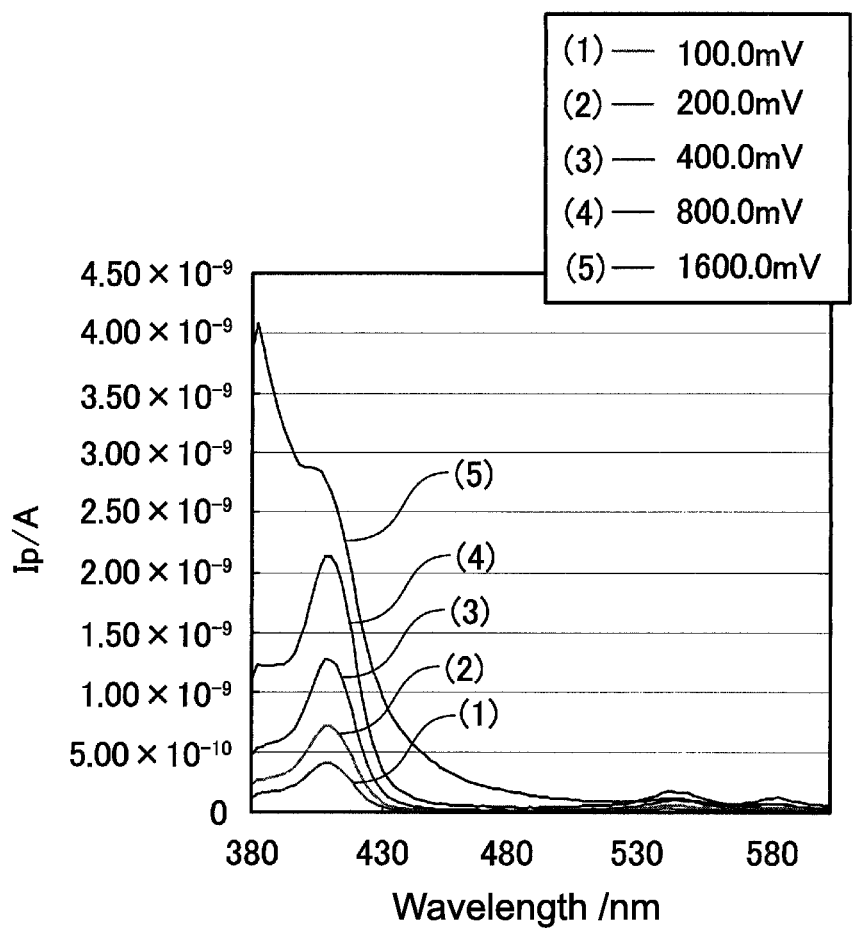
FIG. 18 is a schematic chart showing the results of measuring the photocurrent action spectrum of the complex of zinc-substituted cytochrome c and polyaniline.

Photocurrent action spectra of the samples 1 and 2 were determined at room temperature at a wavelength of 380 to 600 nm. The voltage applied between the ITO electrodes 31 and 32 was changed at 100 mV, 200 mV, 400 mV, 800 mV or 1600 mV. The photocurrent action spectra obtained for samples 1 and 2 are shown respectively in FIGS. 17 and 18. As shown in FIG. 17, there are a peak in the Soret band (428 nm) and peaks in the Q band (550 nm and 580 nm) observed in sample 1. As shown in FIG. 18, there are a peak in the Soret band (408 nm) and peaks in the Q band (550 nm and 580 nm) observed in sample 2.

Figure 19A:
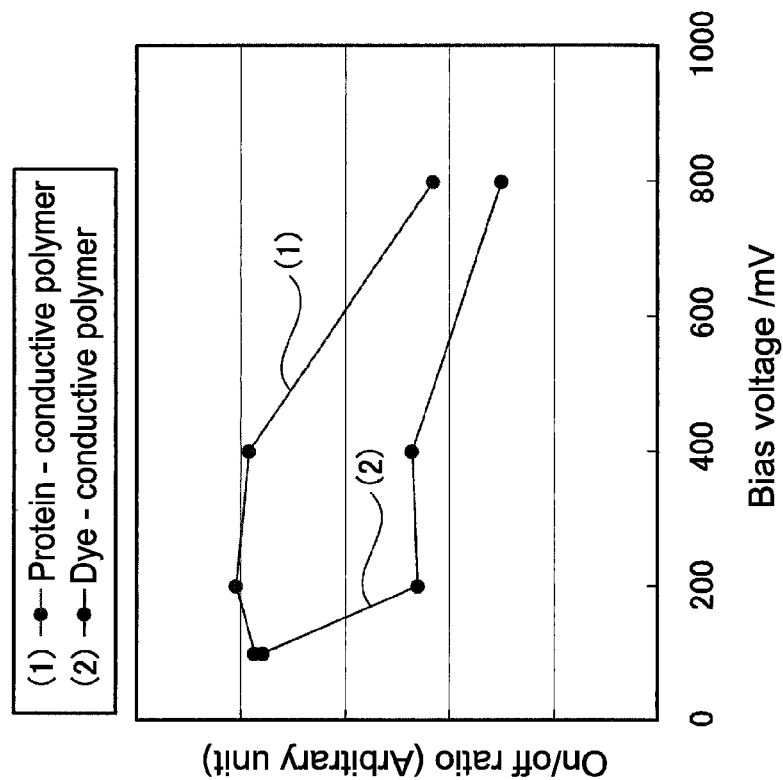
FIGS. 19A and 19B are schematic charts showing the photocurrents and on/off ratios of the complex of zinc protoporphyrin and polyaniline and the complex of zinc-substituted cytochrome c and polyaniline, as they are compared to each other.
Figure 19B:
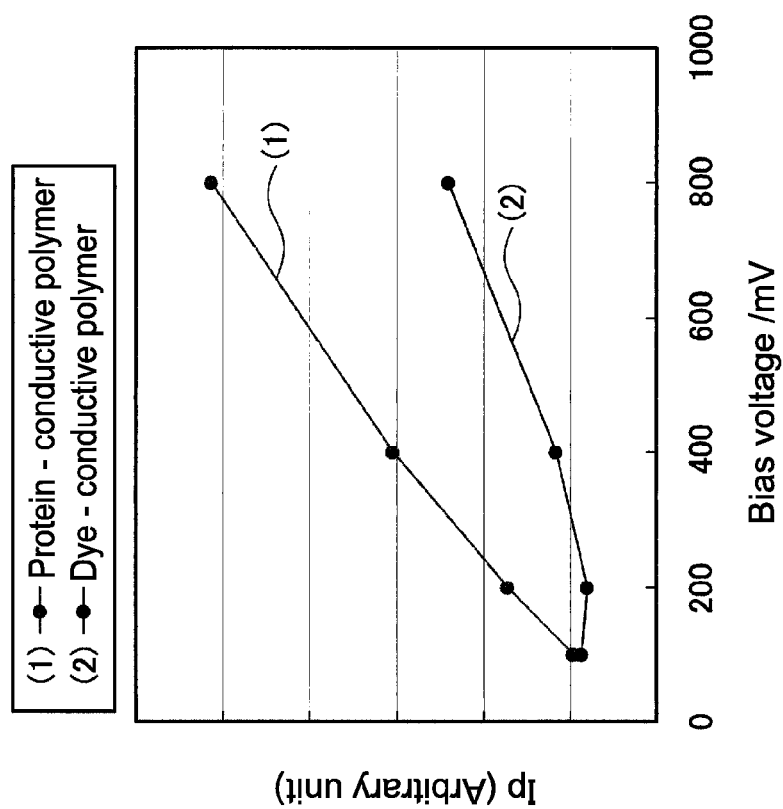

Dependence of the photocurrent $I_p$ obtained from the sample 1 or 2 on the bias voltage is shown in FIG. 19A, and dependence of the on/off ratio of sample 1 or 2 on a bias voltage is shown in FIG. 19B. As obvious from FIGS. 19A and 19B, the sample 2 containing the complex of a conductive polymer and/or polymer semiconductor 21 and a protein 22 was much superior both in photocurrent value and on/off ratio to the sample 1 containing the complex of a conductive polymer and/or polymer semiconductor 21 and a dye 22a.

Figure 20:
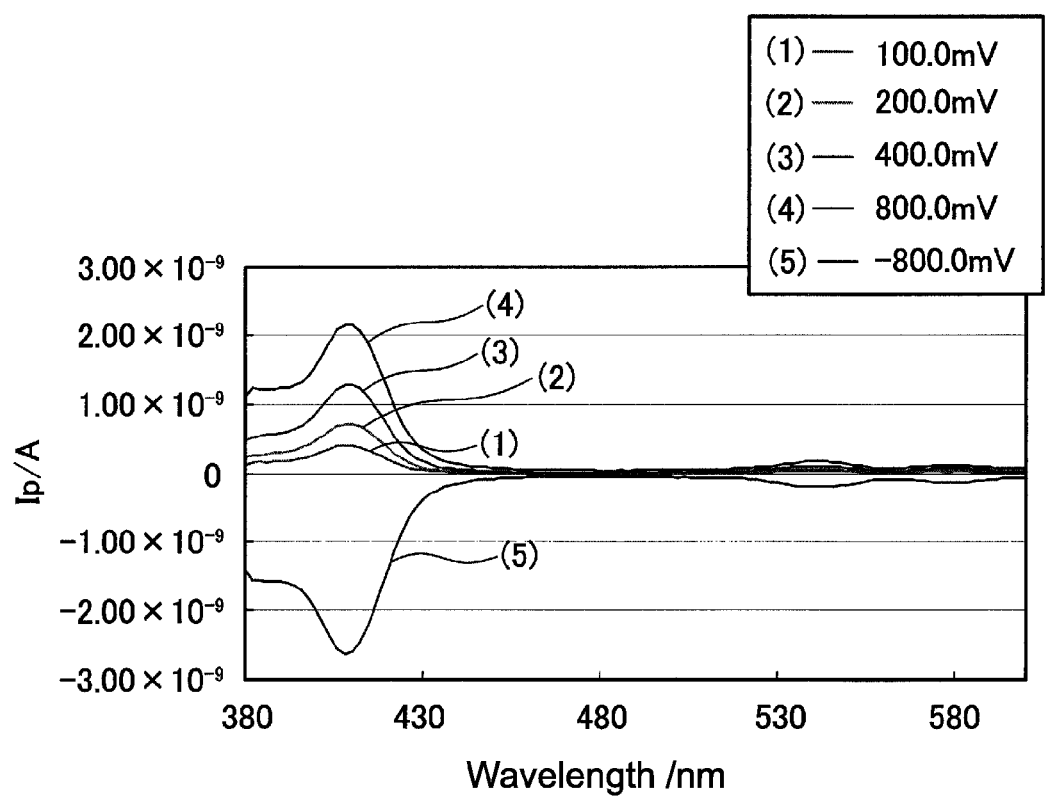
FIG. 20 is a schematic chart showing the results of measuring the photocurrent action spectrum of the complex of zinc-substituted cytochrome c and polyaniline.

For examination of the behavior of the sample 2 containing a photoconductor 27 containing the complex of the conductive polymer and/or the polymer semiconductor 21 and the protein 22 when a positive or negative bias voltage is applied thereto, a bias voltage of −800 mV to +800 mV was applied between the ITO electrodes 31 and 32. The photocurrent action spectrum obtained is shown in FIG. 20. As obvious from FIG. 20, the photocurrent is oppositely directed and symmetrical when the bias voltage applied between the ITO electrodes 31 and 32 is +800 mV or −800 mV.

Example of Adding Other Polymers, in Addition to the Conductive Polymer and/or Polymer Semiconductor 31, to Photoconductor 27

For examination of the influence when other polymers are added in addition to the conductive polymer and/or polymer semiconductor 21, MEH-PPV was used as the conductive polymer and/or polymer semiconductor 21, and PMMA represented by the following structural formula was used as the other polymer.

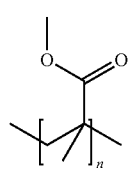

[Chemical Formula 22]

Figure 21:
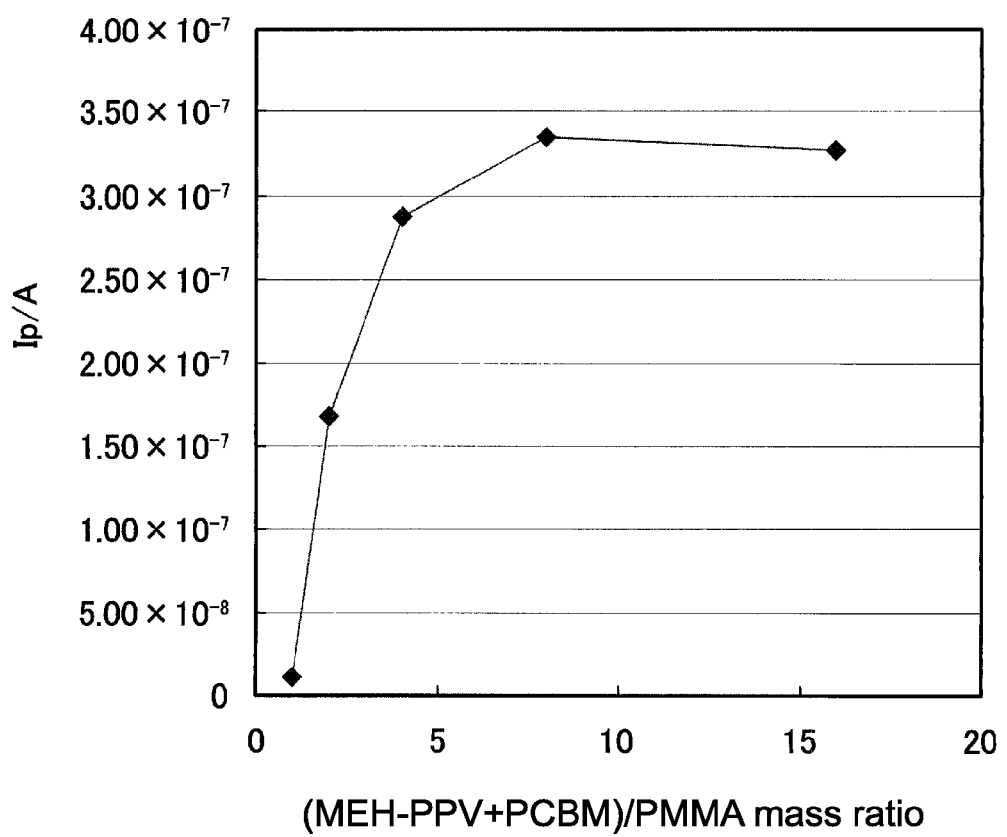
FIG. 21 is a schematic chart showing the results of measuring the photocurrent of the light-receiving element prepared by using a photoconductor produced from a conductive polymer and/or polymer semiconductor and other additional polymers.

For convenience in experiment, [6,6]-phenyl-C61-butyric acid methyl ester (PCBM) was used instead of the protein 22. A photoconductor was prepared by using these MEH-PPV, PMMA and PCBM. Because use of PCBM permits drying of the photoconductor at a temperature of 150° C. or higher during its production, it can shorten the necessary time for production of the photoconductor significantly. A light-receiving element similar to that shown in FIG. 14 was prepared by using the photoconductor. Photoconductors and light-receiving elements were prepared as the addition amount of PMMA was altered. Light at a wavelength of 550 nm was irradiated and the photocurrent $I_p$ was determined, as a bias voltage of 8 V was applied between the ITO electrodes 31 and 32 of these light-receiving elements. The results are shown in FIG. 21. The abscissa in FIG. 21 shows the weight ratio of (MEH-PPV+PCBM) in the PMMA in the photoconductor. As obvious from FIG. 21, when the (MEH-PPV+PCBM)/PMMA mass ratio is approximately 8 or more, in other words when the mass rate of PMMA in the photoconductor is approximately 11% or less, the photocurrent $I_p$ is almost constant and there is no decrease in photocurrent $I_p$ observed by addition of PMMA.

Light-Receiving Element Array in a First Example

A light-receiving element array in a first example formed in the transparent light-receiving layer 13 will be described.

Figure 22:
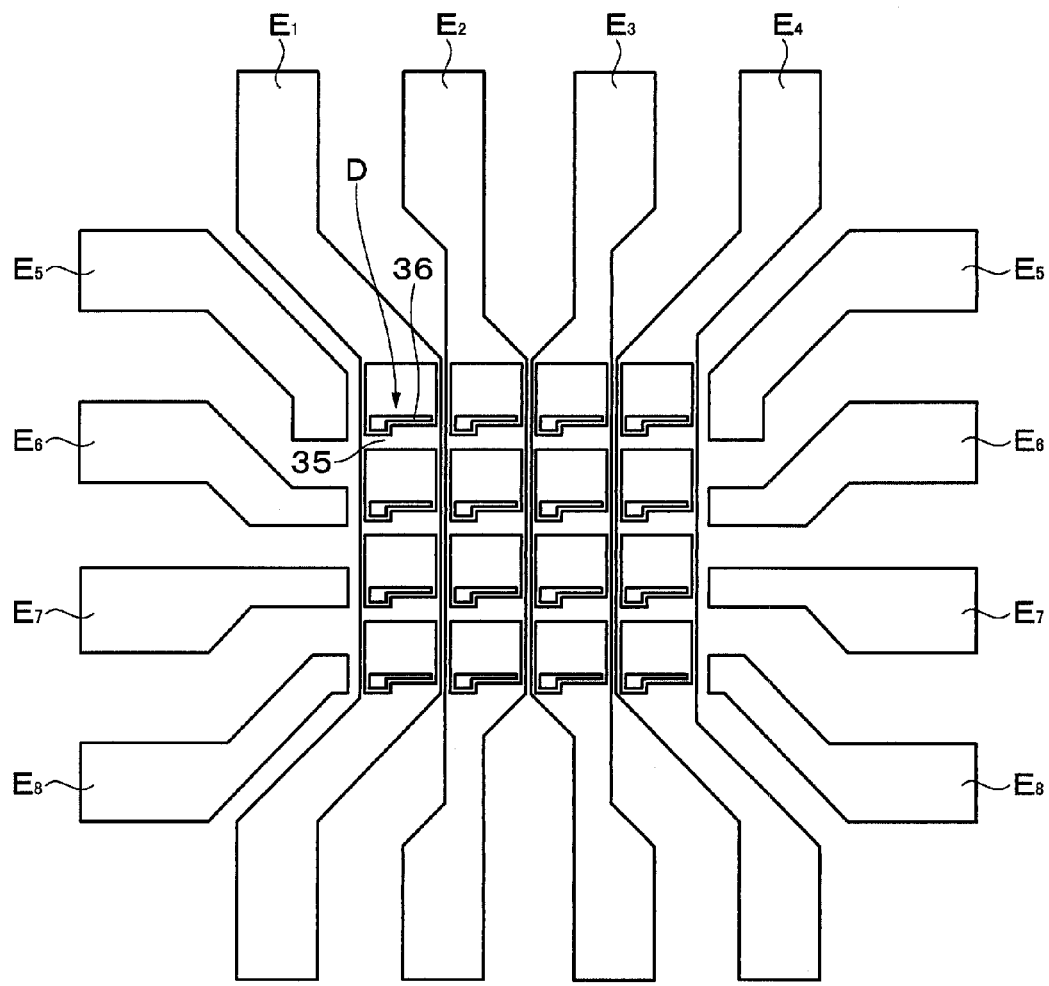
FIG. 22 is a top view illustrating a first example of the light-receiving element array in the transparent light-receiving layer.

FIG. 22 shows such a light-receiving element array. As shown in FIG. 22, the light-receiving element array has light-receiving elements D formed in the two-dimensional array (matrix) shape on a substrate (not shown) such as glass substrate. Here, total 16 light-receiving elements P in the 4×4 arrangement will be described, but the configuration is not limited thereto, and the arrangement pattern and the number of the light-receiving elements D are selected, as necessary. In each light-receiving element D, the electrodes 35 and 36, for example made of ITO, are facing each other and apart from each other. Although not shown in the figure, in each light-receiving element D, a photoconductor is formed, as it covers the electrodes 35 and 36 and as it is electrically connected to these electrodes 35 and 36. Both ends of the electrode 35 of each light-receiving element D in the first column are connected to a fine wire of an electrode $E_1$; the electrode 35 of each light-receiving element D in the second column is connected to a fine wire of an electrode $E_2$; the electrode 35 of each light-receiving element D in the third column is connected to a fine wire of an electrode $E_3$; and the electrode 35 of each light-receiving element D in the fourth column is connected to a fine wire of an electrode $E_4$. In addition, the electrode 36 of each light-receiving element D in the first row is connected to a fine wire of an electrode $E_5$ (not shown); the electrode 36 of each light-receiving element D in the second row is connected to a fine wire of an electrode $E_6$ (not shown); the electrode 36 of light-receiving element D in the third row is connected to a fine wire of an electrode $E_7$ (not shown); the electrode 36 of light-receiving element D in the fourth row is connected to a fine wire of an electrode $E_8$ (not shown). The shape and size of the substrate are selected as necessary, and for example, the shape is a square or a rectangle. The shape and size of the elements 35, 36 and the electrodes $E_1$ to $E_8$ are selected as necessary. The material for the electrodes $E_1$ to $E_8$ is selected properly, as necessary, and it is, for example, Al, Cr, Au or the like. An example of the size of each light-receiving element D is 3.5 mm×3.5 mm.

Another Example of Light-Receiving Element D

Figure 23:
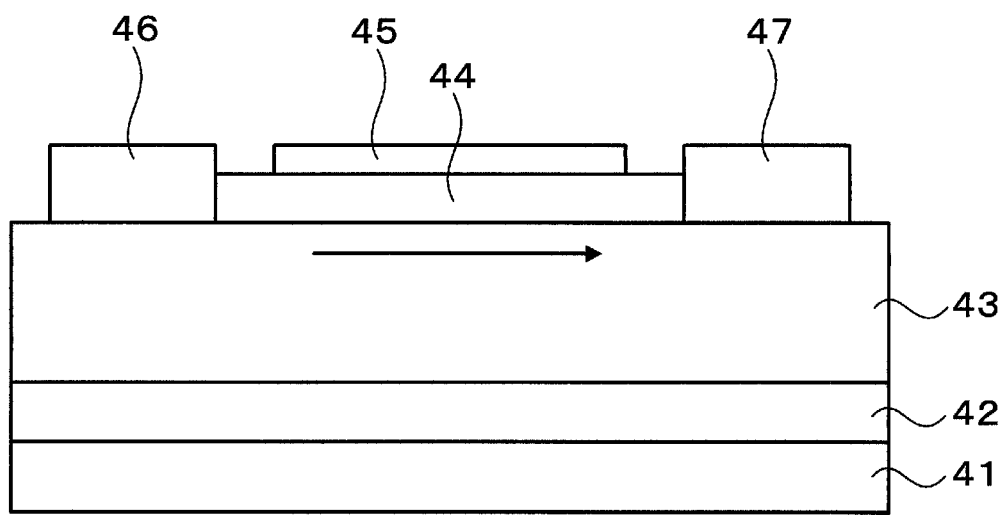
FIG. 23 is a schematic view illustrating another example of the light-receiving element in the transparent light-receiving layer in the three-dimensional interactive display in the first embodiment.

FIG. 23 shows another example of the light-receiving element D. The light-receiving element D is a field effect transistor (FET) type light-receiving element.

As shown in FIG. 23, in the FET type light-receiving element D, on a transparent substrate 41, a transparent conductive layer 42 is disposed, and a photoconductor 43 is disposed thereon. On the photoconductor 43, a gate insulator film 44 having a predetermined shape is disposed, and a gate electrode 45 having a predetermined shape is disposed. These gate insulator film 44 and gate electrode 45 are transparent. On the photoconductor 43 at both sides of the gate insulator film 44, a source electrode 46 and a drain electrode 47 are disposed.

As the transparent substrate 41, the one similar to the transparent substrate 13a may be used, for example. The transparent substrate 41 may be the transparent substrate 13a itself, or may be disposed on the transparent substrate 13a. The transparent conductive layer 42 includes, for example, ITO, FTO, graphene or the like. The photoconductor 43 is similar to the photoconductor 27. The gate insulator film 44 includes, for example, $SiO_2$ and the like. The gate electrode 45, the source electrode 46 and the drain electrode 47, may include, for example, transparent materials similar to those of the first electrode 28 and the second electrode 29.

In the FET type light-receiving element D, when the light is not irradiated (dark state), a free current density (carrier density) in the photoconductor 43 is significantly low, and no conductive channel is therefore formed in the photoconductor 43 adjacent to an interface between the photoconductor 43 and the gate insulator film 44, even if a voltage that is required to form the conductive channel in the photoconductor 43 adjacent to an interface between the gate insulator film 44 and the photoconductor 43 (gate voltage) is applied to the gate channel 45. For this reason, no photocurrent flows between the source electrode 46 and the drain electrode 47.

On the other hand, when the photoconductor 43 of the light receiving element D is irradiated with light having photon energy sufficient for excitation of the dye 22a of protein 22, the dye 22a is excited, giving electron-hole pairs (excitons). The electrons or holes of the electron-hole pairs thus generated are injected from the dye 22a into the conductive polymer and/or polymer semiconductor 21 through routes formed in the protein 22 (photodoping). When electrons or holes are injected in this way, a free current density (carrier density) of the conductive polymer and/or polymer semiconductor 21 increases rapidly. When a bias voltage is applied between the source electrode 46 and the drain electrode 47, and when a gate voltage, that is required to form the conductive channel in the photoconductor 43 adjacent to an interface between the gate insulator film 44 and the photoconductor 43, is applied to the gate channel 45, the conductive channel is formed in the photoconductor 43 adjacent to an interface between the gate insulator film 44 and the photoconductor 43. In this way, the holes or electrons injected into the conductive polymer and/or polymer semiconductor 21 move to the source electrode 46 or the drain electrode 47 that is lower or higher in electric potential, causing flow of the photocurrent between the source electrode 46 and the drain electrode 47 as shown by an arrow in FIG. 23. For example, when the bias voltage is applied between the source electrode 46 and the drain electrode 47 so that the source electrode 46 becomes higher in electric potential, the holes injected into the conductive polymer and/or polymer semiconductor 21 move to the drain electrode 47, causing flow of the photocurrent from the source electrode 46 to the drain electrode 47. The photocurrent increases when the intensity of the light irradiated to the photoconductor 43 increases. When no bias voltage is applied between the source electrode 46 and the drain electrode 47 (bias voltage=0), no photocurrent flows between the source electrode 46 and the drain electrode 47 even if the photoconductor 43 is irradiated with light. The direction of the photocurrent flowing between the source electrode 46 and the drain electrode 47 can be controlled by the polarity of the bias voltage applied between the source electrode 46 and the drain electrode 47. When the intensity of the light entering into the photoconductor 43 is constant, the photocurrent flowing between the source electrode 46 and the drain electrode 47 can be controlled by the wavelength of the incident light and the bias voltage applied between the source electrode 46 and the drain electrode 47.

Light-Receiving Element Array in a Second Example

Figure 24A:
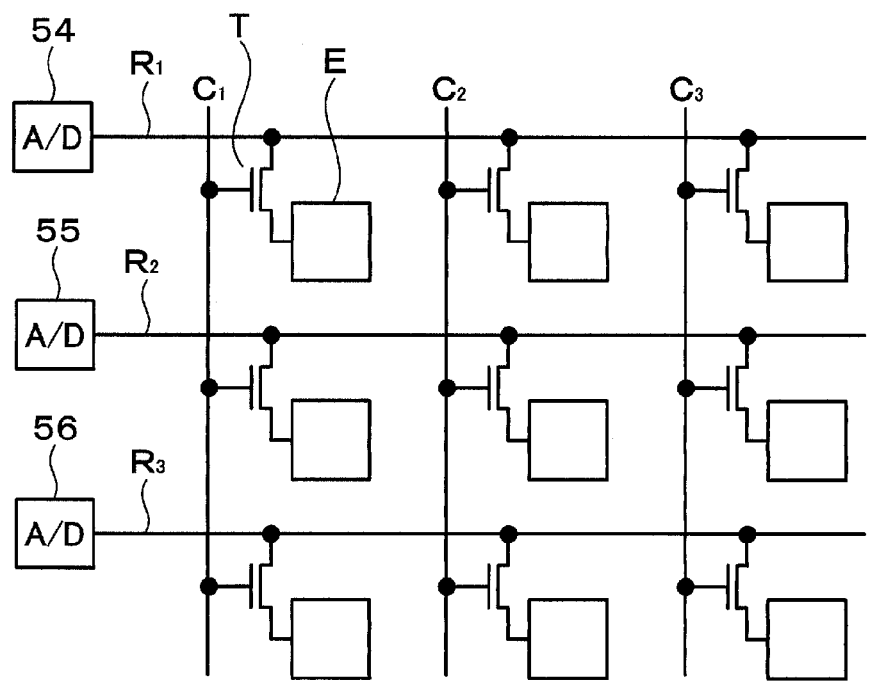
FIGS. 24A and 24B are a circuit diagram and a cross-sectional view illustrating a second example of the light-receiving element array in the transparent light-receiving layer in the three-dimensional interactive display in the first embodiment.
Figure 24B:
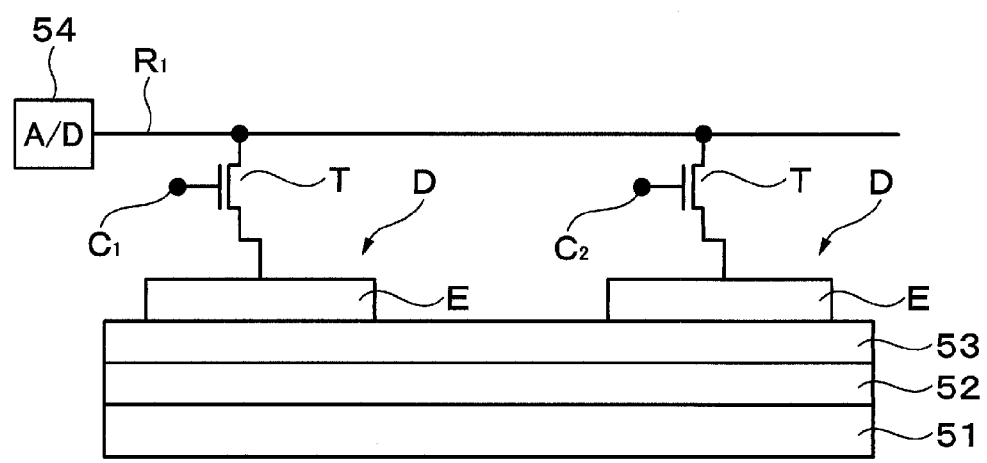

FIG. 24A is a circuit diagram illustrating a second example of the light-receiving element array, and FIG. 24B is a cross-sectional view illustrating the second example of the light-receiving element array. The light-receiving element array is a two-dimensional array of the light-receiving elements D using a thin film transistor (TFT) as a pixel selecting switching transistor similar to the liquid crystal display. The light-receiving element array can easily form a large area one by combining with the production technology of the known flat panel display in the past.

As shown in FIGS. 24A and 24B, the light-receiving element array includes a transparent substrate 51 made of glass, a transparent electrode 52 and a photoconductor 53 in this order. In each light-receiving element D, a transparent upper electrode E is formed on the photoconductor 53. In other words, each light-receiving element D has a structure that the photoconductor 53 is sandwiched between the transparent electrode 52 and the upper electrode E. The light-receiving elements D are arranged in the two-dimensional array to form the light-receiving element array. In the light-receiving element array, row selection lines $R_1$, $R_2$, $R_3$, . . . and column selection lines $C_1$, $C_2$, $C_3$, . . . are disposed. At an intersection of the row selection lines $R_1$, $R_2$, $R_3$, . . . and the column selection lines $C_1$, $C_2$, $C_3$, . . . , the pixel selecting switching transistor T including an n channel TFT is formed. More specifically, each of the row selection lines $R_1$, $R_2$, $R_3$, . . . is connected to the source electrode of each switching transistor T in a row direction, and each of the column selection lines $C_1$, $C_2$, $C_3$, . . . is connected to the gate electrode of each switching transistor T in a column direction. The upper electrode E is connected to the drain electrode of each switching transistor T. Each of the row selection lines $R_1$, $R_2$, $R_3$, . . . is connected to each of current input analog to digital (A/D) convertor ICs 54, 55, 56, . . . . The switching transistor T can be formed by the known technology in the past using any material.

In the light-receiving element, when it is not irradiated with light (in dark state), the conductive polymer and/or polymer semiconductor 21 and the protein 22 constituting the photoconductor 53 are both insulators, and thus the photoconductor 53 is an insulator.

On the other hand, when the photoconductor 53 of the light-receiving element D is irradiated with light having photon energy sufficient for excitation of the dye 22a of protein 22, the dye 22a is excited, giving electron-hole pairs (excitons). The electrons or holes of the electron-hole pairs thus generated are injected from the dye 22a into the conductive polymer and/or polymer semiconductor 21 through routes formed in the protein 22 (photodoping). When electrons or holes are injected in this way, the conductivity of the conductive polymer and/or polymer semiconductor 21 increases rapidly and the conductivity of the 53 also increases rapidly.

For example, a predetermined positive voltage is applied to the transparent electrode 52. Then, a predetermined positive gate voltage is applied to one column selection line selected from the column selection lines $C_1$, $C_2$, $C_3$, . . . . One row selection line selected from the row selection lines $R_1$, $R_2$, $R_3$, . . . has, for example, a ground potential. Then, the switching transistor T is turned on at the intersection of the one column selection line selected from the column selection lines $C_I$, $C_2$, $C_3$, . . . and the one row selection line selected from the row selection lines $R_1$, $R_2$, $R_3$, . . . , the upper electrode E connected to the switching transistor T has a ground potential. When light enters into the light-receiving element D and the conductivity of the photoconductor 53 increases, current flows from the transparent electrode 52 to the upper electrode E, passes through the switching transistor T, flows to the one row selection line selected from the row selection lines $R_1$, $R_2$, $R_3$, . . . , be converted by the A/D convertor IC connected to the row selection line, and be detected as the photocurrent. By the detection of the photocurrent, the light that entered into the light-receiving element D at the intersection of the one column selection line selected from the column selection lines $C_1$, $C_2$, $C_3$, . . . and the one row selection line selected from the row selection lines $R_1$, $R_2$, $R_3$, . . . , is detected.

Light-Receiving Element Array in a Third Example

Figure 25:
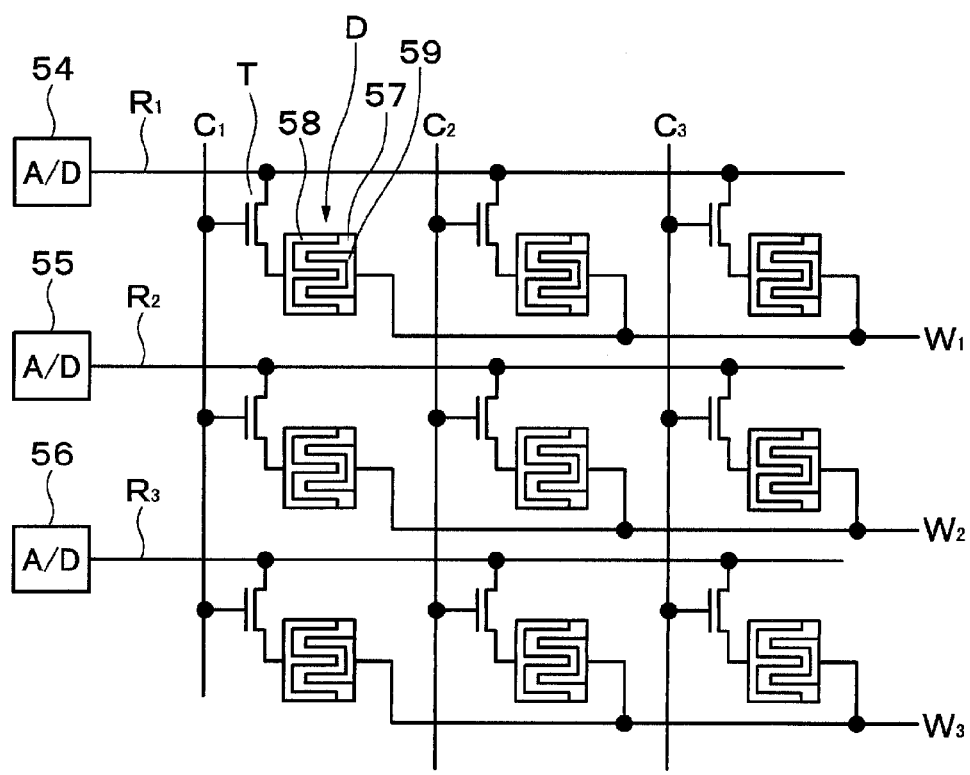
FIG. 25 is a circuit diagram illustrating a third example of the light-receiving element array in the transparent light-receiving layer in the three-dimensional interactive display in the first embodiment.

FIG. 25 is a circuit diagram illustrating a third example of the light-receiving element array. In the second example of the light-receiving element array shown in FIGS. 24A and 24B, the light-receiving element D had a structure that the photoconductor 53 is sandwiched between the transparent electrode 52 and the upper electrode E. In contrast, in the light-receiving element array in a third example, the light-receiving element D has a pair of comb-shaped electrodes 58 and 59 disposed on the photoconductor 57. These comb-shaped electrodes 58 and 59 intermesh and face each other at a predetermined distance apart. The comb-shaped electrode 58 is connected to a drain electrode of each switching transistor T. The comb-shaped electrode 59 is connected to wires $W_1$, $W_2$, $W_3$ . . . for applying bias. The rest of the structure of the light-receiving element array is similar to that of the light-receiving element array in the second example.

The light-receiving element array acts as follows: For example, a predetermined positive voltage is applied to wires $W_1$, $W_2$, $W_3$ . . . . Then, one column selection line selected from the column selection lines $C_1$, $C_2$, $C_3$, . . . is applied a predetermined positive gate voltage, and one row column selection line selected from the row selection lines $R_1$, $R_2$, $R_3$, . . . has a ground potential. At an intersection of one column selection line selected from the column selection lines $C_1$, $C_2$, $C_3$, . . . , and one row column selection line selected from the row selection lines $R_1$, $R_2$, $R_3$, . . . , the switching transistor T is turned on, and the comb-shaped electrode 58 connected to the switching transistor T has a ground potential. When light enters into the light-receiving element D and the electrical conductivity of the photoconductor 53 increases, a current flows from the comb-shaped electrode 59 to the comb-shaped electrode 58, and passes through the switching transistor T, flows to one row selection line selected from the row selection lines $R_1$, $R_2$, $R_3$, . . . , be converted by an A/D converter IC connected to the row selection line, and be detected as photocurrent. By the detection of the photocurrent, the light entered into the light-receiving element D at the intersection of one column selection line selected from the column selection lines $C_1$, $C_2$, $C_3$, . . . and one row column selection line selected from the row selection lines $R_1$, $R_2$, $R_3$, . . . , is detected.

Light-Receiving Element Array in a Fourth Example

Figure 26:
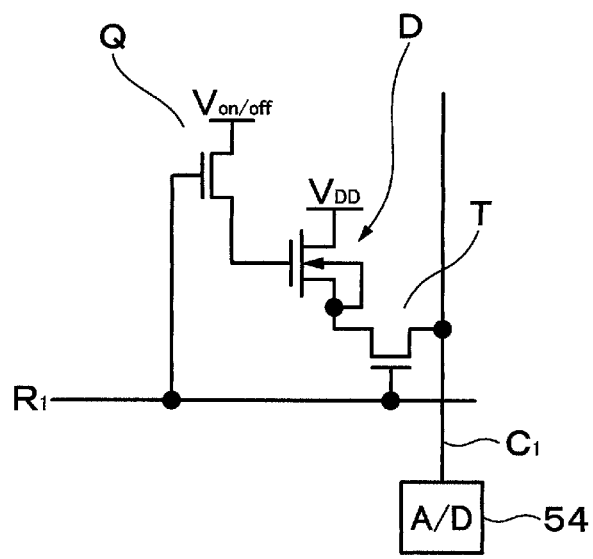
FIG. 26 is a circuit diagram illustrating a fourth example of the light-receiving element array in the transparent light-receiving layer in the three-dimensional interactive display in the first embodiment.

FIG. 26 is a circuit diagram illustrating a fourth example of the light-receiving element array.

As shown in FIG. 26, in the light-receiving element array, the light-receiving element D has the FET type structure as shown in FIG. 23. The light-receiving elements D are aligned in the two-dimensional matrix to form the light-receiving element array. In the light-receiving element array, row selection lines $R_1$, $R_2$, $R_3$, . . . and column selection lines $C_1$, $C_2$, $C_3$, . . . are disposed. In FIG. 26, only the row selection line $R_1$ and the column selection line $C_1$ are shown. At an intersection of the row selection lines $R_1$, $R_2$, $R_3$, . . . and the column selection lines $C_1$, $C_2$, $C_3$, . . . , the pixel selection switching transistor T including an n channel TFT is formed. More specifically, each of the row selection lines $R_1$, $R_2$, $R_3$, . . . is connected to the gate electrode of each switching transistor T in a row direction, and each of the column selection lines $C_1$, $C_2$, $C_3$, . . . is connected to the source electrode of each switching transistor T in a column direction. The source electrode of the FET type light-receiving element D is connected to the drain electrode of each switching transistor T. Each of the column selection lines $C_1$, $C_2$, $C_3$, . . . is connected to A/D convertor ICs 54, 55, 56, . . . . In FIG. 26, only the A/D convertor IC 54 is shown. The gate electrode D of the FET type light-receiving element D is connected to the drain electrode of a driving transistor Q, such as a thin film transistor. A voltage $V_{on/off}$ is applied to the source electrode of the driving transistor Q. The gate electrode of the driving transistor Q is connected to the row selecting line $R_1$.

The light-receiving element array acts as follows: A predetermined positive voltage is applied to one row selection line selected from the row selection lines $R_1$, $R_2$, $R_3$, . . . . One column selection line selected from the column selection lines $C_1$, $C_2$, $C_3$, . . . has, for example, a ground potential. At an intersection of one column selection line selected from the column selection lines $C_1$, $C_2$, $C_3$, . . . and one row column selection line selected from the row selection lines $R_1$, $R_2$, $R_3$, . . . , the switching transistor T is turned on, and, at the same time, the driving transistor Q is turned on. Thus, when the driving transistor Q is turned on, a voltage $V_{on/off}$ is applied to the gate electrode of the FET type light-receiving element D. To the drain electrode of the FET type light-receiving element D, a voltage $V_{DD}$ is applied. When light enters into the FET type light-receiving element D and the electrical conductivity of the photoconductor 43 increases, a current flows between the source electrode 46 and the drain electrode 47 of the FET type light-receiving element D, passes through the switching transistor T, flows to one column selection line selected from the column selection lines $C_1$, $C_2$, $C_3$, . . . , be converted by an A/D converter IC connected to the column selection line, and be detected as photocurrent. By the detection of the photocurrent, the light entered into the FET type light-receiving element D at the intersection of one column selection line selected from the column selection lines $C_1$, $C_2$, $C_3$, . . . and one row selection line selected from the row selection lines $R_1$, $R_2$, $R_3$, . . . , is detected.

Application of Three-Dimensional Interactive Display

The three-dimensional interactive display can be used as an optical touch panel used for an inputting device of a personal computer, a mobile phone and a tablet. An application example of the personal computer is shown in FIG. 27.

Figure 27:
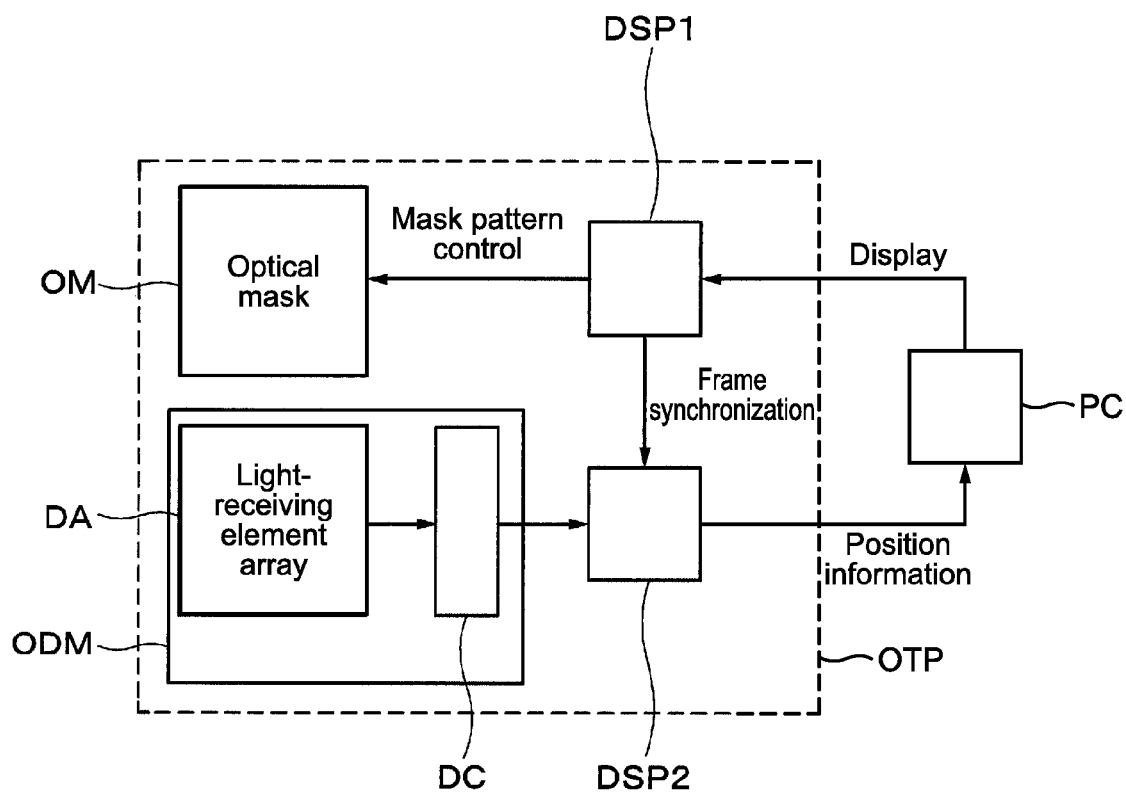
FIG. 27 is a block diagram illustrating an application of the three-dimensional interactive display in the first embodiment.

As shown in FIG. 27, an optical touch panel OTP includes an optical mask OM and an object detection module ODM. The object detection module ODM includes a light-receiving element array DA and a detection circuit DC. An output signal from the light-receiving element array DA is supplied to the detection circuit DC. An output signal from the detection circuit DC is supplied to a signal processing device DSP2. An output signal of the signal processing device DSP2 is supplied to a personal computer PC as position information. In the personal computer PC, a display signal is generated based on the position information. The display signal is supplied to a signal processing device DSP1. An output signal of the signal processing device DSP1 is supplied to the optical mask OM where the mask patterns formed by the light modulation layer 12 are controlled. A frame synchronization signal is supplied from the signal processing device DSP1 to the signal processing device PSP2, so that the signal from the light-receiving element array DA to the optical mask OM can be synchronized with each other.

The optical mask OM is configured to display the mask patterns and contents from the personal computer PC alternately. In an optical mask mode, the mask patterns are accumulated on buffers in the two signal processing devices DSP1 and DSP2, and are transferred alternately to the light modulation layer 12 such as a driving circuit of a liquid crystal panel (not shown). Since the mask patterns can be determined easily, writing to a memory is not needed. Thus, a speed of switching the mask patterns can be improved. On the other hand, in a display mode, movie contents are supplied from a buffer in a third signal processing device (not shown), and are written in the driving circuit of the liquid crystal panel. Depending on signal timing and signal processing ability, some frames may be omitted. A linear scanning is conducted sequentially by the buffers in the three signal processing devices such that the operations in the display mode and the optical mask mode at a stable frame speed are assured.

Figure 28A:
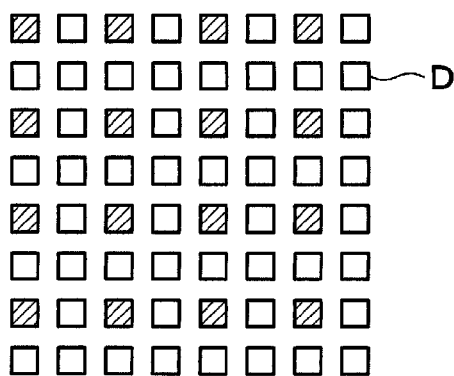
FIGS. 28A and 28B are schematic views illustrating a standby mode and a capture mode of the three-dimensional interactive display shown in FIG. 27.
Figure 28B:
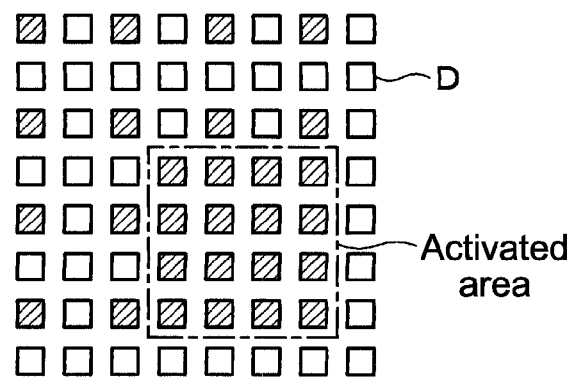

In a typical case, since the function of the three-dimensional interactive display is to detect the position of the object approaching to the screen of the three-dimensional interactive display, there is no need to full scan the light-receiving element array all the time. When no object is detected, the three-dimensional interactive display can be set to a standby mode. This state is shown in FIG. 28A. As shown in FIG. 28A, in the standby mode, among some of the light-receiving elements D (pixels) disposed in a light-receiving element array matrix, for example, only every other light-receiving elements D is activated (diagonal lines are drawn in active light-receiving elements D in FIG. 28A as well as in FIG. 28B), and the scanning is conducted for detecting the object. Once the object is detected in a certain area of the light-receiving element array, the three-dimensional interactive display is switched to a capture mode. This state is shown in FIG. 28B. As shown in FIG. 28B, in the capture mode, all light-receiving elements D in the area where the object is detected (for example, the area surrounded by a dashed dotted line in FIG. 28B) are activated, and the position of the object can be detected with a high accuracy.

According to the first embodiment, a wide variety of advantages can be provided as follows: That is, the scattered light 17, generated by irradiating the object 15 approaching to the screen of the three-dimensional interactive display with the probe light 16, is spatially modulated by the light modulation layer 12 and is received by the transparent light-receiving layer 13. And therefore, the multi-touch sensing and three-dimensional gesture recognition can be easily enabled with high resolution, even if the object 15 is distantly-positioned from the screen. In addition, since the display panel 14 is disposed independently, the image can be displayed independently of the detection of the object 15, and the display panel 14 can be configured with high resolution independently of resolution of the light modulation layer 12. Furthermore, since the image of the object 15 can be formed on the light-receiving surface of the transparent light-receiving layer 13 without using a lens, the space for disposing the lens is not needed, and, in turn, the three-dimensional interactive display can be thin. The three-dimensional interactive display is, for example, suitable for a three-dimensional interactive television, a tablet, a mobile phone and a portable game device. When the display panel 14 is composed of E Ink, a small-sized mobile device with low electric power consumption, e.g., a touch control electronic book, can be embodied.

The use of the light-receiving elements D using a novel photoconductor 27 can prevent electrons and holes from recombined and disappeared between the proteins 22, so that the higher light-receiving efficiency can be provided as compared with the photodiodes in the past. The limit of the light-receiving efficiency of the photodiodes in the past is 100%. In contrast, the limit of the light-receiving elements D can over 100%. The photodiodes in the past cannot control the light-receiving efficiency in order to be operated by applying a reverse bias. In contrast, the light-receiving elements D can easily control the light-receiving efficiency by the bias voltage applied between the first electrode 28 and the second electrode 29. Also, the light-receiving elements D can decrease dark current significantly. The photoconductor 27 can be configured flexible, and the light-receiving elements D can be configured flexible, as well. By using a flexible substrate, the light-receiving elements D and the transparent light-receiving layer 13 can be configured flexible. Since the shape and the size of the photoconductor 27 can be selected freely, the shape and the size of the light-receiving elements D can be selected freely.

2. Second Embodiment

Three-Dimensional Interactive Display

Figure 29:
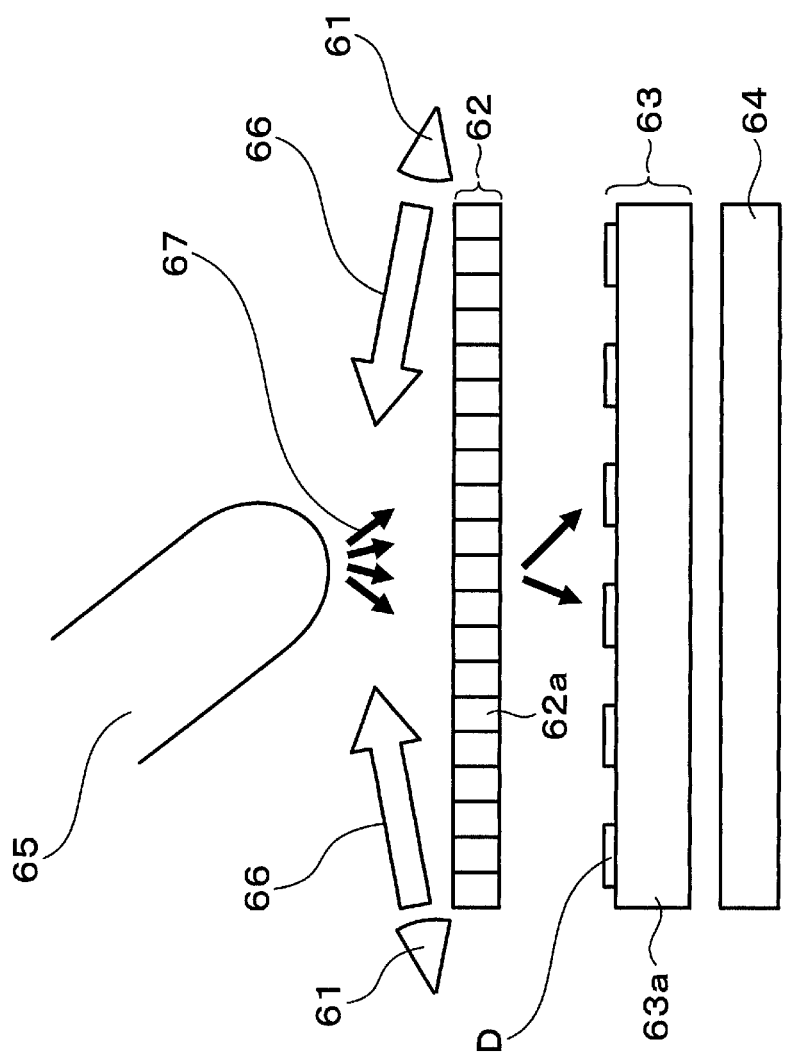
FIG. 29 is a schematic view illustrating the three-dimensional interactive display in a second embodiment.

FIG. 29 shows a multi touch three-dimensional interactive display in a second embodiment.

As shown in FIG. 29, the three-dimensional interactive display has a light source 61 generating ultraviolet light or infrared light, the light modulation layer 62, the transparent light-receiving layer 63 and the back light panel 64. Typically, the light modulation layer 62, the transparent light-receiving layer 63, and the display panel 64 are disposed in parallel to each other. The light modulation layer 62 and the transparent light-receiving layer 63 are apart from each other at a predetermined distance. The transparent light-receiving layer 63 and the back light panel 64 may be directly contacted each other, or may be apart from each other at a predetermined distance. Although not shown in the figure, a diffuser panel that diffuses light from the back light panel 64 to provide uniform back light may be disposed between the transparent light-receiving layer 63 and the back light panel 64, as necessary. Fundamentally, any kind of back light panel may be used as the back light panel 64. For example, a cold cathode fluorescent tube or an LED back light in which an LED array is formed on a substrate may be used.

Similar to the first embodiment, the light source 61 is for irradiating an object 65 with a probe light 66 including ultraviolet light or infrared light in order to detect the object 65 approaching to a front of a screen of the three-dimensional interactive display, e.g., a front of the light modulation layer 62. The light source 61 may be similar to the light source 11.

In this case, different from the first embodiment, the display panel 14 is not used. Therefore, the light modulation layer 62 acts as a space filter of the scattered light 67 that enters into the light modulation layer 62, and also acts as a display panel for displaying the image. Accordingly, the light modulation layer 62 can be switched in two modes: a detection mode for obtaining the image of the object, and a display mode for displaying the image on the light modulation layer 62. In other words, the light modulation layer 62 is set to the detection mode when the object 65 approaching to the front of the screen is being detected, and, is set to the display mode when the image is displayed on the light modulation layer 62.

The transparent light-receiving layer 63 has the structure similar to that of the transparent light-receiving layer 13.

The three-dimensional interactive display has a configuration similar to that of the three-dimensional interactive display in the first embodiment with the exception of the above description.

It is possible in the second embodiment to obtain advantages similar to those obtained in the first embodiment.

3. Third Embodiment

Three-Dimensional Interactive Display

Figure 30:
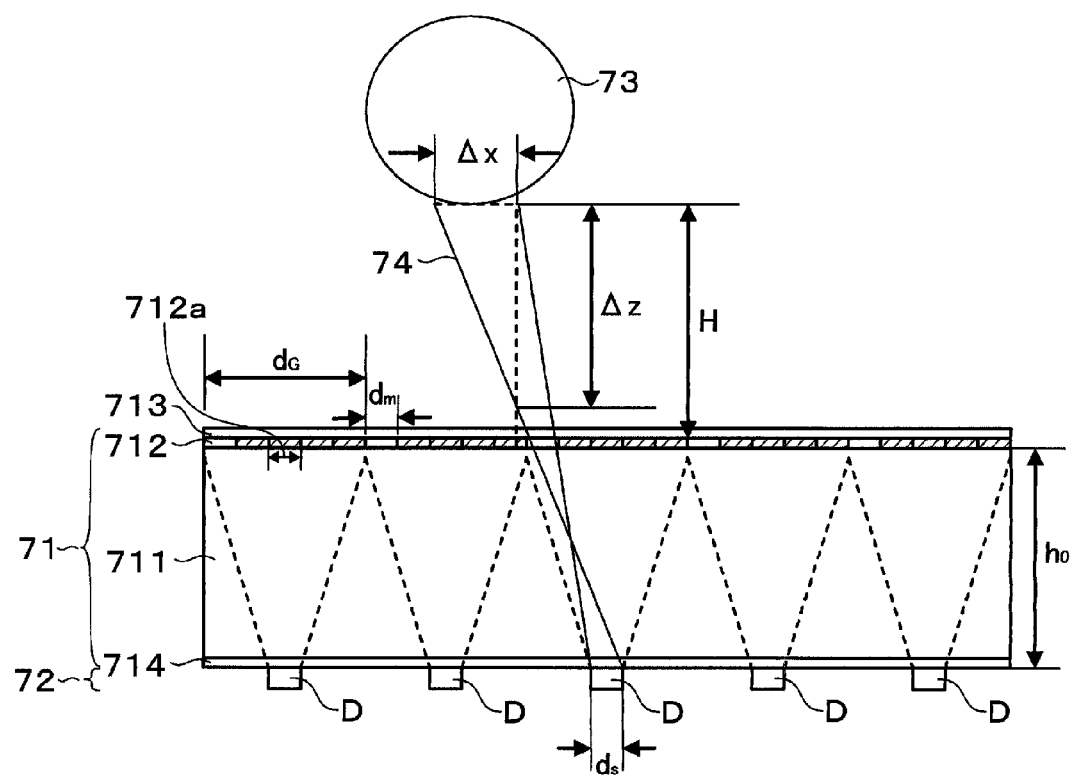
FIG. 30 is a schematic view illustrating the three-dimensional interactive display in a third embodiment.

FIG. 30 shows a three-dimensional interactive display in a third embodiment.

As shown in FIG. 30, the three-dimensional interactive display has a liquid crystal panel 71 as the light modulation layer and a transparent light-receiving layer 72. Although not shown in the figure, in the three-dimensional interactive display, a light source generating ultraviolet light or infrared light for detecting an object 73 at a front of the screen of the liquid crystal panel 71 is disposed at peripheral of the liquid crystal panel 71, and the display panel or the back light panel is disposed at a rear side of the transparent light-receiving layer 72. The display panel may be similar to the display panel 14 in the first embodiment, and the back light panel may be similar to the back light panel 64 in the second embodiment.

In the liquid crystal panel 71, a liquid crystal layer 712 is disposed on a top surface of a transparent glass substrate 711, a polarization filter 713 is disposed on the liquid crystal layer 712, and a polarization filter 714 is disposed on a bottom surface of the transparent glass substrate 711. Although not shown in the figure, as in typical liquid crystal panels, a transparent electrode is disposed between the liquid crystal layer 711 and the polarization filter 712 per pixel, and a common transparent electrode is disposed between the liquid crystal layer 712 and the polarization filter 713. By applying a predetermined voltage between the transparent electrode disposed per pixel and the common transparent electrode, an orientation of the liquid crystal molecules of the liquid crystal layer 712 in each pixel is controlled, thereby controlling transparency/opacity of the liquid crystal layer 712 in each pixel.

The transparent light-receiving layer 72 includes a light-receiving element array having light-receiving elements D disposed on a bottom surface of the polarization filter 714. The light-receiving elements D may be similar to those mentioned as in the first embodiment. In this case, there is no need to use the transparent substrate for forming the light-receiving elements D.

In order to provide the image of an object 73 at various view angles, the pixels of the liquid crystal panel 71 are divided into pixel groups including one pixel or a plurality of pixels arranged periodically. The light-receiving element array located directly below each pixel group is substituted with one light-receiving element.

In order to detect a scattered light 74 from the object 73 at various view angles, a pinhole in each pixel group is moved. For example, in order to detect the scattered light 74 entered into the liquid crystal panel 71 from the object 73 vertically, the pinhole should be set in a center of each pixel group. In order to detect the scattered light 74 entered into the liquid crystal panel 71 from the object 73 in an oblique direction, the pinhole should be set in other position in each pixel group.

Detection accuracy of this method can be determined by two parameters. One parameter is vertical resolution $\Delta z$ in a direction vertical to a surface of the liquid crystal panel 71. The other parameter is traverse resolution $\Delta x$. These two parameters are determined by the light-receiving elements D, more specifically, a size $d_s$ of a light-receiving surface, a size $d_m$ of a pixel in the liquid crystal panel 71, a distance $h_0$ between the liquid crystal layer 711d and the light-receiving element D, and a size $d_G$ of the pixel group of the liquid crystal panel 71 (see FIG. 30). The size of the pixel of the liquid crystal panel 71 is greater than a wavelength of the scattered light 74 by three-digit numbers or more. The distance $h_0$ between the liquid crystal layer 712 and the light-receiving elements D is a similar level of the size of the pinhole. Therefore, a diffraction effect generated when the pinhole is passed through is ignored hereinafter.

By a geometric relationship based on FIG. 30, a transverse resolution $\Delta x$ can be represented by the following formula:

$$\Delta x = \frac{d_m + d_s}{h_0}(H + d_m) \qquad \text{[Formula 1]}$$

The uncertainty $\Delta y$ can be represented by the following formula:

$$\Delta y = \frac{2 d_G \cdot (d_m + d_s)}{d_G^2 - (d_m + d_s)^2} \cdot H - \frac{2 d_m (d_m + d_s)}{d_G^2 - (d_m + d_s)^2} \cdot h_0 \qquad \text{[Formula 2]}$$

When the size of the pixel group is much greater than those of the pinholes of the light-receiving elements D, $\Delta y$ can be represented by the following formula:

$$\Delta y = \frac{2(d_m + d_s)}{d_G} \cdot H - \frac{2 d_m (d_m + d_s)}{d_G^2} \cdot h_0 \qquad \text{[Formula 3]}$$

The formulae of the spatial uncertainty show the following:

(1) The spatial uncertainty increases linearly along with the distance between the object 73 and the liquid crystal panel 71.

(2) The smaller pinhole and light-receiving elements D contribute to a decrease in the uncertainty in both directions, but limits the amount of photons entered into the light-receiving elements D to decrease the sensitivity.

(3) An increase in the distance between the liquid crystal panel 71 and the light-receiving elements D can decrease the uncertainly in both directions, but increase the thickness of the three-dimensional interactive display.

(4) From a standpoint of decreasing the uncertainty in the vertical direction, the size of the pixel group is preferably greater. However, if the size of the pixel group is excessively great, an amount of information from the object 73 is decreased, and the resolution of the object to be reconstructed may be decreased.

A simulation is run in the three-dimensional interactive display. In the simulation, the following parameters were used.

$d_m$=0.2 mm, $d_s$=0.1 mm, $d_G$=1.8 mm and $h_0$=2 mm

Accordingly, the spatial uncertainty can be represented by the following formula in mm:

$$\Delta x = 0.15 H + 0.3 \qquad \text{[Formula 4]}$$

$$\Delta z = \frac{12}{35} \cdot H - \frac{24}{35} \approx 0.343 H - 1.37$$

Taking the index of refraction (about 1.7) in the glass substrate of the liquid crystal panel 71, the spatial uncertainty can be represented by the following formulae:

$$\Delta x \approx 0.08H + 0.15$$

$$\Delta z \approx 0.343H - 2.7 \quad \text{[Formula 5]}$$

Figure 31:
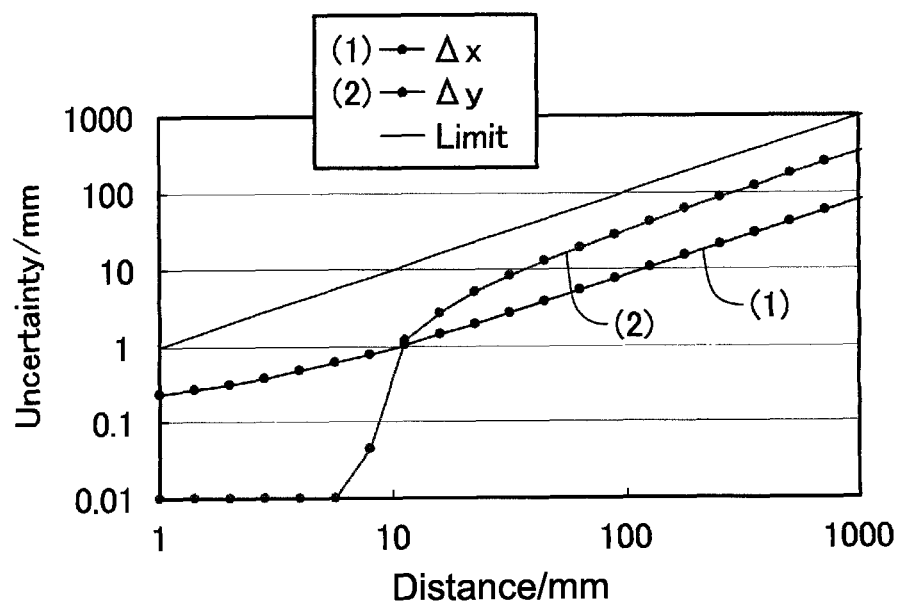
FIG. 31 is a schematic chart showing a dependency between spatial uncertainty of an object and a height of the object from a screen in the three-dimensional interactive display in the third embodiment.

The relationship between the height of the object 73 and the spatial uncertainty is shown in FIG. 31.

Figure 32:
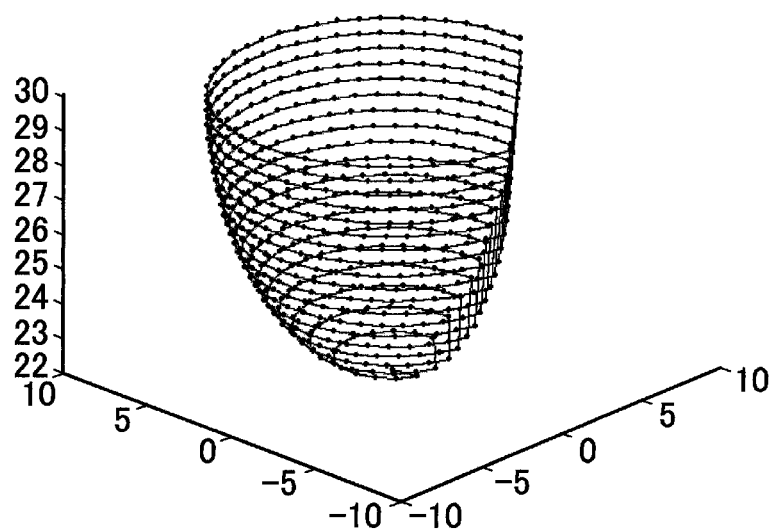
FIG. 32 is a schematic chart showing a discretization modeling of a hemispherical object from the screen in the three-dimensional interactive display in the third embodiment.

In Monte Carlo Simulation, a hemisphere with a radius of 8 mm was used to simulate human fingers (FIG. 32). Three quarters of the hemisphere were set to discharge photons randomly in all directions with uniform probability distribution. The model represents a reasonable decrease in the actual diffusion.

Figure 33A:
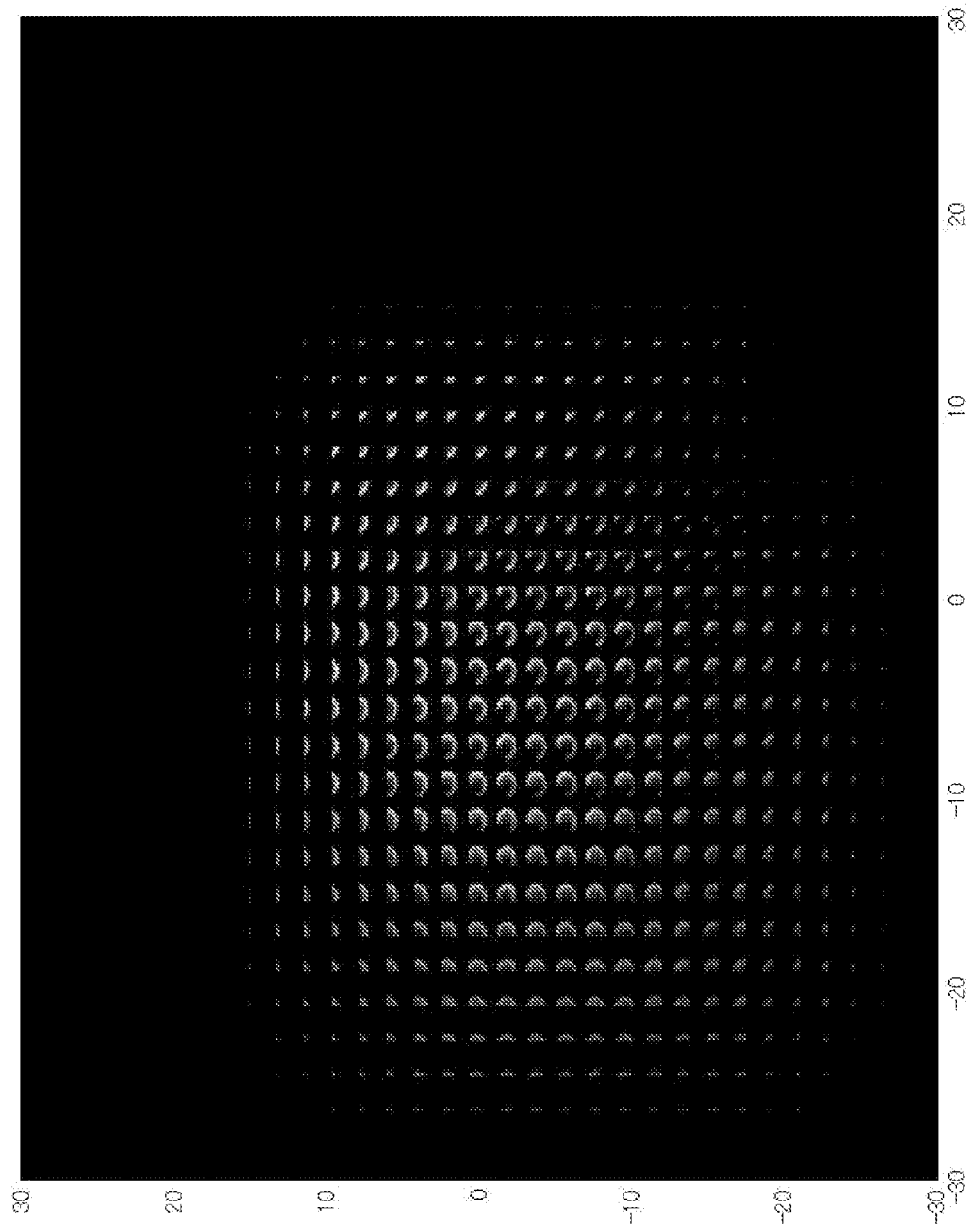
FIGS. 33A and 33B are schematic rough images projected on a light-receiving surface of the transparent light-receiving layer through a liquid crystal mask of a liquid crystal panel used as a light modulation layer in the three-dimensional interactive display in the third embodiment.
Figure 33B:
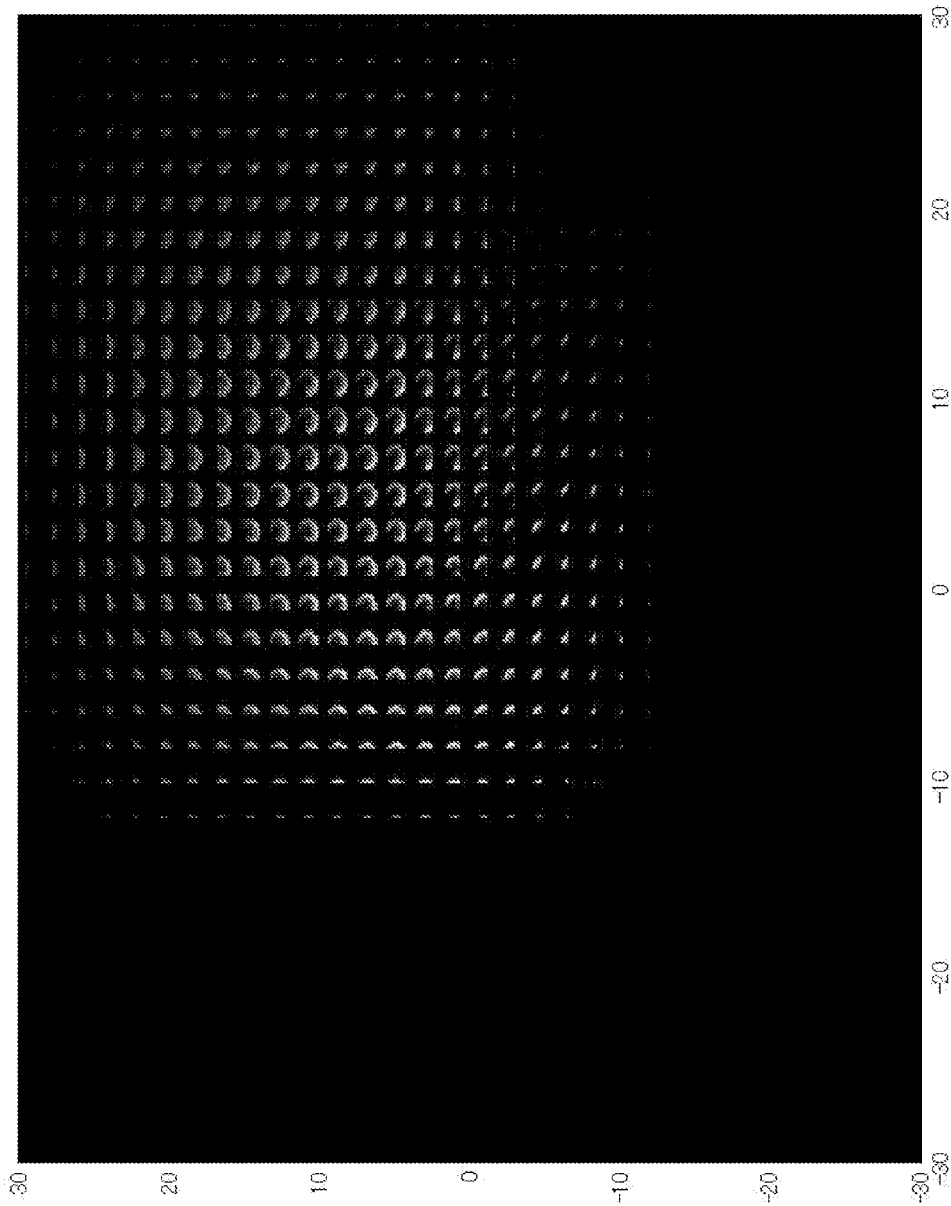

In accordance with the relationship between a spherical coordinate and an orthogonal coordinate, when $\cos(\theta)$ and $\phi$ are distributed uniformly, discharged photons shows a random and uniform spherical distribution. It ignores the object itself or all photons which strike a boundary between pixel groups. By way of example, when the object 73 is in a height of 40 mm above a mask face, the original images obtained at different angles are shown in FIGS. 33A and 33B. FIG. 33A is the image at an angle of 23°, and FIG. 33B is the image at angle of −23°.

Figure 34A:
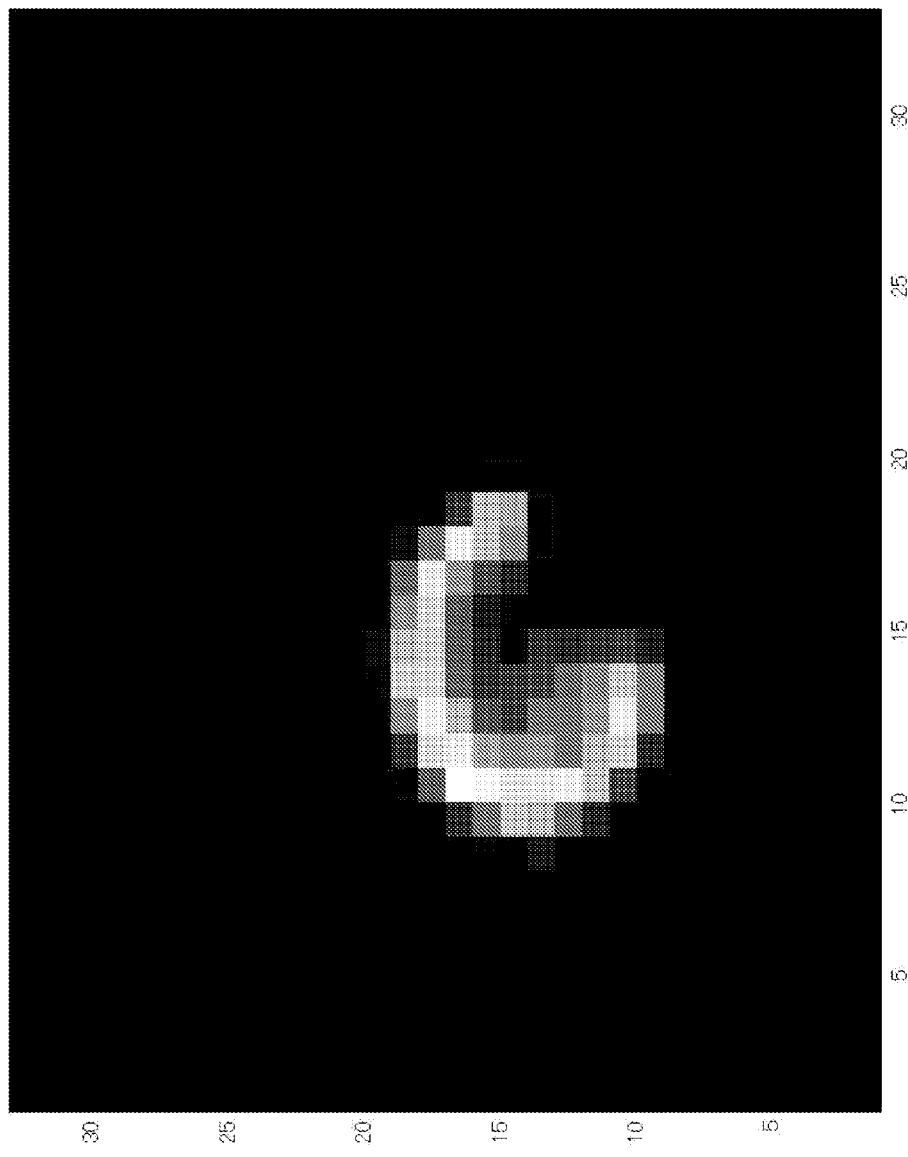
FIGS. 34A and 34B are schematic images obtained by receiving the light by the light-receiving element, the light being irradiated on the light-receiving surface of the transparent light-receiving layer, through a liquid crystal mask of a liquid crystal panel which is used as a light modulation layer, in the three-dimensional interactive display in the third embodiment.
Figure 34B:
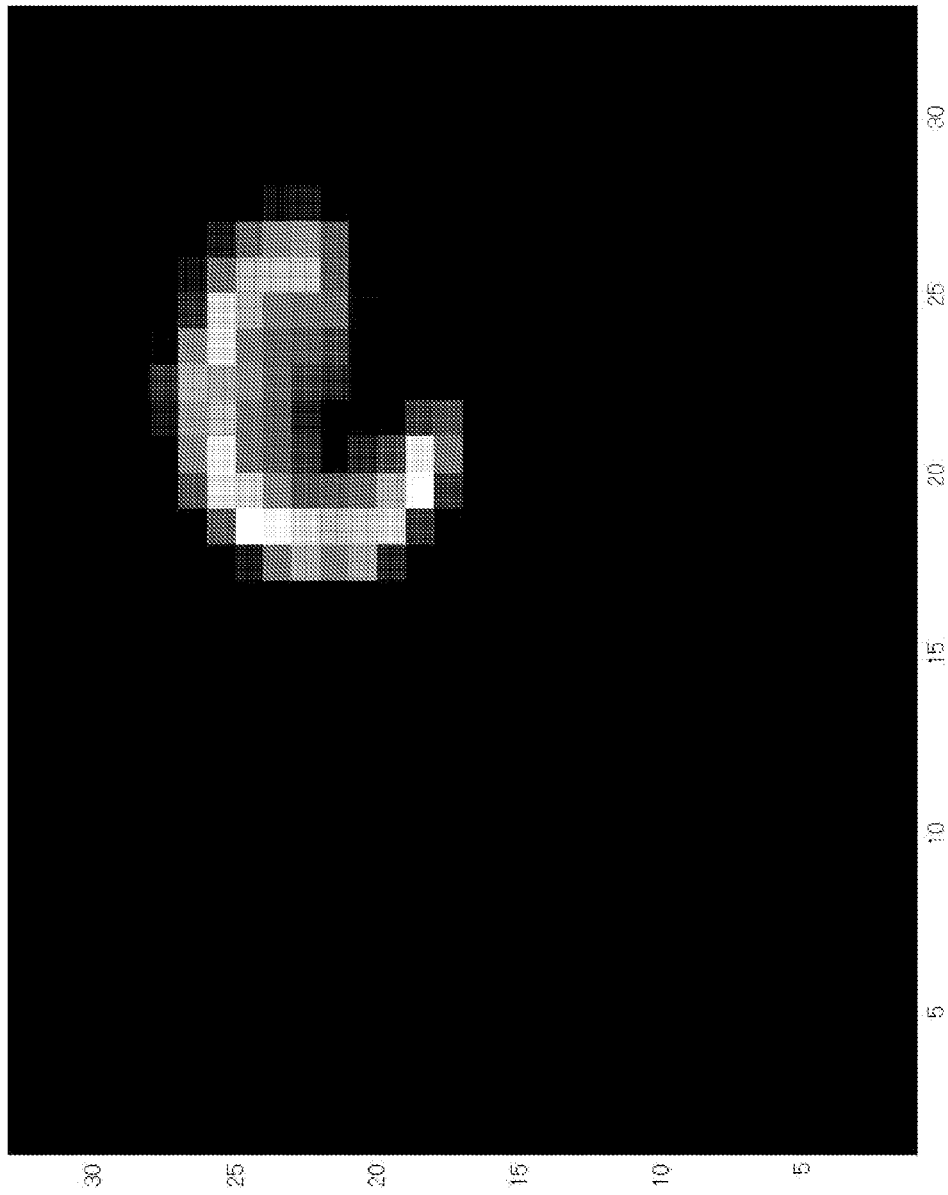

By removing photons which cannot arrive at the light-receiving surface, the images can be regenerated at various angles as shown in FIGS. 34A and 34B. FIG. 34A is the image at an angle of 23°, and FIG. 34B is the image at angle of −23°. When the accurate position of the object 73 from the bottom was measured, H=33 mm (the accurate height is 32 mm). This mismatch is within acceptable error range.

It is possible in the third embodiment to obtain advantages similar to those obtained in the first embodiment. In addition, since the position of the object 73 disposed apart from the screen can be accurately detected, the three-dimensional gesture recognition can be advantageously enabled more accurately. The three-dimensional interactive display is suitably applied for a mobile phone and a portable game device.

Embodiments and examples of the present disclosure have been described, but the technology is not limited to those described above in the embodiments and examples, and various modifications are possible within the technological scope of the present application.

For example, the numerical values, structures, configurations, shapes and materials described above in embodiments and examples are nothing but examples and numerical values, structures, configurations, shapes, materials and others different from them may be used, as necessary.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A three-dimensional interactive display, comprising:
   a light source configured to irradiate an object to be detected with a light;
   a light modulation layer, into which a scattered light generated by irradiating the object with the light from the light source enters, configured to have at least a capability of modulating an intensity of the scattered light;
   a transparent light-receiving layer configured to receive the light transmitted through the light modulation layer; and
   one of a display panel and a back light panel, which is disposed on the opposite side of the transparent light-receiving layer from the light modulation layer;
   the light source generates ultraviolet light or infrared light;
   the light source is configured to generate the light so that the light irradiates the whole space in front of a screen of the three-dimensional interactive display;
   the light modulation layer is a liquid crystal panel;
   the display panel is an organic light-emitting diode display panel, a plasma display panel or a liquid crystal display panel; and
   the transparent light-receiving layer includes a light-receiving element array on which a plurality of light-receiving elements is arranged, each of which has a photoconductor containing a complex of a conductive polymer and/or polymer semiconductor and at least one of a protein containing a dye having a long-lived excited state, an organic dye, and an inorganic dye.

2. The three-dimensional interactive display according to claim 1, wherein
   the conductive polymer and/or polymer semiconductor is electrically connected to first and second electrodes therebetween.

3. The three-dimensional interactive display according to claim 2, wherein
   the conductive polymer and/or polymer semiconductor and the at least one of the protein, the organic dye, and the inorganic dye are bound to each other via non-covalent or covalent bonds.

4. The three-dimensional interactive display according to claim 3, wherein
   the conductive polymer and/or polymer semiconductor forms a network.

5. The three-dimensional interactive display according to claim 4, wherein
   the dye is fluorescent or phosphorescent.

6. The three-dimensional interactive display according to claim 5, wherein
   the protein is at least one protein selected from a group including electron transfer proteins, coenzyme-containing proteins, globins, fluorescent proteins and variants of the fluorescent proteins.

7. The three-dimensional interactive display according to claim 6, wherein
   the complex contains additionally another polymer higher in mechanical strength than the conductive polymer and/or polymer semiconductor.

8. The three-dimensional interactive display according to claim 6, wherein
   the photoconductor and the first and second electrodes are formed on a substrate.

9. The three-dimensional interactive display according to claim 8, wherein
   the substrate and the first and second electrodes are transparent.

* * * * *